United States Patent [19]

Dehnert et al.

[11] 4,145,341
[45] Mar. 20, 1979

[54] WATER-SOLUBLE AZO DYES CONTAINING DIAMINOPYRIMIDINE COUPLER COMPONENTS

[75] Inventors: Johannes Dehnert; Guenter Dunkelmann, both of Ludwigshafen, Fed. Rep. of Germany

[73] Assignee: BASF Aktiengesellschaft, Ludwigshafen, Fed. Rep. of Germany

[21] Appl. No.: 643,525

[22] Filed: Dec. 22, 1975

Related U.S. Application Data

[63] Continuation-in-part of Ser. No. 434,248, Jan. 17, 1974, abandoned.

[30] Foreign Application Priority Data

Jan. 19, 1973 [DE] Fed. Rep. of Germany ....... 2302582

[51] Int. Cl.$^2$ .................... C09B 29/36; C09B 31/14; C09B 31/28
[52] U.S. Cl. .................. 260/154; 260/196; 260/205; 260/206; 260/207; 260/207.1; 544/122; 544/323; 544/326; 544/327; 544/329
[58] Field of Search ....................... 260/154

[56] References Cited

U.S. PATENT DOCUMENTS

| | | | |
|---|---|---|---|
| 3,527,748 | 9/1970 | Ackermann et al. | 260/154 |
| 3,531,457 | 9/1970 | Ackermann et al. | 260/154 |
| 3,531,458 | 9/1970 | Ackermann et al. | 260/154 |
| 3,532,682 | 10/1970 | Ackermann et al. | 260/154 |
| 3,558,261 | 1/1971 | Ackermann et al. | 260/154 |
| 3,598,801 | 8/1971 | Beffa et al. | 260/154 |
| 3,856,772 | 12/1974 | Dunkelmann et al. | 260/154 |

FOREIGN PATENT DOCUMENTS 2302582 8/1974 Fed. Rep. of Germany ........... 260/154

OTHER PUBLICATIONS

Venkataraman, "The Chemistry of Synthetic Dyes", vol. I, Academic Press Inc., New York, 1952, p. 270.

*Primary Examiner*—Charles F. Warren
*Attorney, Agent, or Firm*—Keil & Witherspoon

[57] ABSTRACT

Dyes having the formula:

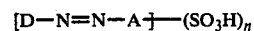

$$[D-N=N-A]-(SO_3H)_n$$

in which
D is the radical of a diazo component; and
A is the radical of a pyrimidine coupling component bearing two unsubstituted or substituted amino groups as substituents. The dyes are eminently suitable for dyeing natural and synthetic polyamides; brilliant colorations are obtained.

12 Claims, No Drawings

WATER-SOLUBLE AZO DYES CONTAINING DIAMINOPYRIMIDINE COUPLER COMPONENTS

This application is a continuation-in-part of our copending application Ser. No. 434,248 (now abandoned).

The invention relates to dyes which in the form of the free acid correspond to the formula (I):

in which

D is the radical of a diazo component; n is one of the integers 1, 2 and 3; A is a radical of the formula (IIa) or (IIb):

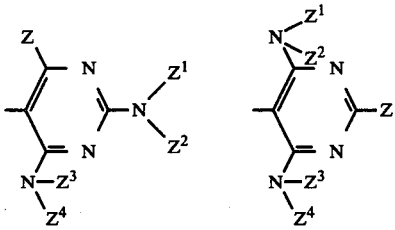

Z is hydrogen or unsubstituted or substituted alkyl, cycloalkyl, aralkyl or aryl; and $Z^1$, $Z^2$, $Z^3$ and $Z^4$ independently of one another may be hydrogen or unsubstituted or substituted alkyl, cycloalkyl, polycycloalkyl, aralkyl or aryl.

One of the radicals $Z^1$ to $Z^4$ is preferably other than hydrogen.

The invention relates particularly to dyes of the formula (III):

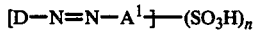

in which

D and n have the above meanings and $A^1$ is a radical of the formula (IVa) of (IVb):

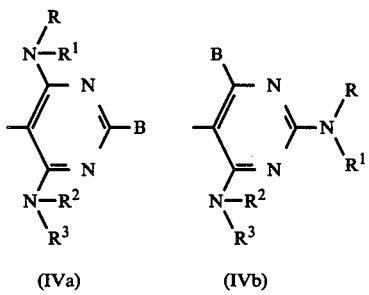

B is hydrogen, alkyl, alkyl bearing hydroxy, alkoxy, alkanoyloxy or phenoxy as a substituent, aralkyl, cycloalkyl, phenyl or phenyl bearing alkyl, halogen, nitro, cyano, alkoxycarbonyl, carbamoyl or sulfamoyl as a substituent;

R is hydrogen, alkyl of one to eight carbon atoms which may be interrupted by oxygen atoms and which may bear hydroxy, acyloxy, alkoxy, cyano, cycloalkoxy, aralkoxy or aroxy as a substituent, cycloalkyl or polycycloalkyl of five to fifteen carbon atoms which may bear hydroxy, chloro, hydroxyalkyl, chloroalkyl or alkyl as a substituent, aralkyl of seven to fifteen carbon atoms, phenyl, phenyl bearing chloro, hydroxy, alkoxy, alkyl, hydroxyalkyl or hydroxyalkoxy as a substituent, alkenyl, pyrrolidonylalkyl or carboxyalkyl;

$R^1$ is hydrogen, alkyl of one to eight carbon atoms or hydroxyalkyl of two to nine carbon atoms;

R and $R^1$ with the nitrogen may be the radical of pyrrolidine, piperidine or morpholine; and, independently of each other, $R^2$ may have the same meaning as R;

$R^3$ may have the same meaning as $R^1$; and $R^2$ and $R^3$ together may have the same meaning as R and $R^1$ together;

and in which the radical D and/or the substituents B and R to $R^3$ may contain sulfonic acid groups.

The radical D of the diazo component may be derived particularly from aniline, aminophthalimide and aminoazobenzene derivatives and these may bear for example hydroxysulfonyl, halogen, hydroxy, alkyl, alkoxy, acylamino, cyano, alkylsulfone, phenylsulfone, nitro, carboxyl, carbalkoxy, carbamoyl, N-substituted carbamoyl, sulfamoyl, N-substituted sulfamoyl or benzothiazolyl.

Examples of individual substituents, in addition to those already mentioned, are: chloro, bromo, methyl, ethyl, trifluoromethyl, methoxy, ethoxy, methylsulfonyl, ethylsulfonyl, carbomethoxy, carboethoxy, carbo-β-ethoxyethoxy, carbo-β-methoxyethoxy, carbobutoxy, carbo-β-butoxyethoxy, N-methylcarbamoyl, N-ethylcarbamoyl, N-butylcarbamoyl, N-hexylcarbamoyl, N-β-ethylhexylcarbamoyl, N-β-hydroxyethylcarbamoyl, N-β-methoxyethylcarbamoyl, N-γ-methoxypropylcarbamoyl, N,N-dimethylcarbamoyl, N,N-diethylcarbamoyl, N-methyl-N-β-hydroxyethylcarbamoyl, N-phenylcarbamoyl, carboxylic acid piperidide, morpholide or pyrrolidide and the corresponding sulfonamides, acetylamino, propionylamino, butyrylamino, methylsulfonylamino, phenylsulfonylamino, hydroxyacetylamino, benzoylamino, p-chlorobenzoylamino, phenylacetylamino and the radicals of the formulae

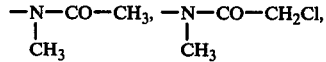

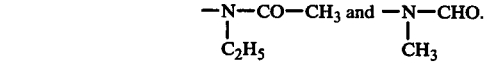

Examples of radicals Z or B (other than hydrogen) are: alkyl of one to seven carbon atoms, methoxyethyl, ethoxyethyl, phenoxyethyl, benzyl, phenylethyl, 1-phenylpropyl, cyclohexyl, phenyl, methylphenyl, chlorophenyl, methoxyphenyl, ethoxyphenyl, nitrophenyl, carbamoylphenyl or sulfamoylphenyl. The amide groups may also be N-monosubstituted or N,N-disubstituted and examples of such substituents are alkyl (—CH₃, —C₂H₅, —C₄H₉), cyclohexyl or phenyl.

The following radicals are also suitable:

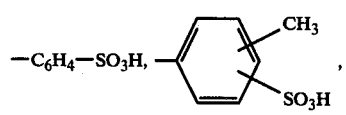

-continued

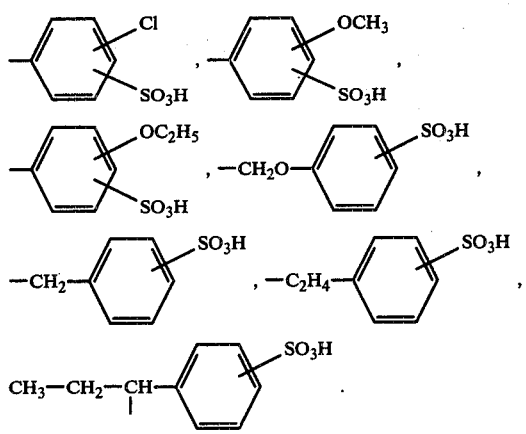

Preferred examples of radical B are: hydrogen, methyl, ethyl, propyl, butyl, α-ethylpentyl, benzyl, phenylethyl, phenyl which may bear methyl, ethyl, methoxy, ethoxy or chloro as substituents and the radicals of the formulae:

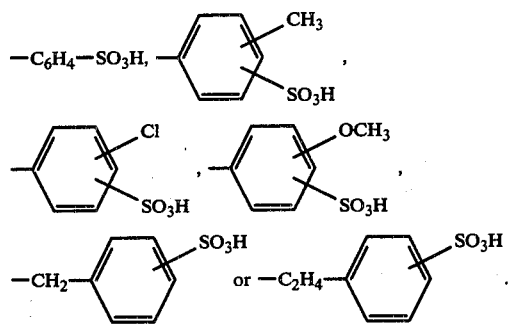

Specific examples of radicals $Z^1$ to $Z^4$ and R to $R^3$ (in addition to those already specified) are:

(1) optionally substituted alkyl: $CH_3$, $C_2H_5$, n—$C_3H_7$, i—$C_3H_7$, n—$C_4H_9$, i—$C_4H_9$, $C_6H_{13}$,

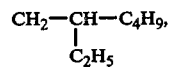

$CH_2CH_2OH$, $(CH_2)_3OH$,

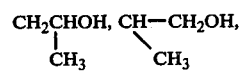

$(CH_2)_4OH$ $(CH_2)_6OH$,

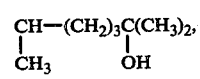

$(CH_2)_2O(CH_2)_2OH$, $(CH_2)_3O(CH_2)_4OH$, $(CH_2)_3OC_2H_4OH$, $(CH_2)_3OC_2H_4OCH_3$, $(CH_2)_3OC_2H_4OC_2H_5$, $(CH_2)_3O(CH_2)_6OH$, $(CH)_3OC_2H_4OCH(CH_3)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

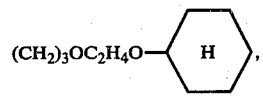

$(CH_2)_3OC_2H_4OC_6H_5$,

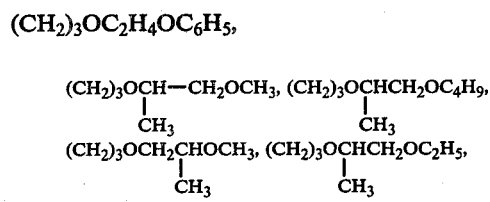

the corresponding radicals in which the groupings:
—$OC_2H_4$—

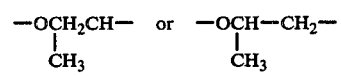

are present twice, three times or four times, $CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$,

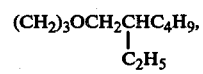

$(CH_2)_3OC_6H_{13}$, $(CH_2)_3OC_8H_{17}$,

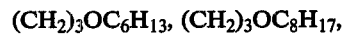

$(CH_2)_3OCH_2C_6H_5$, $(CH_2)_3OC_2H_4C_6H_5$, $(CH_2)_3OC_6H_5$,

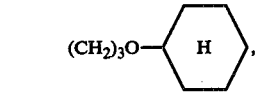

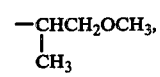

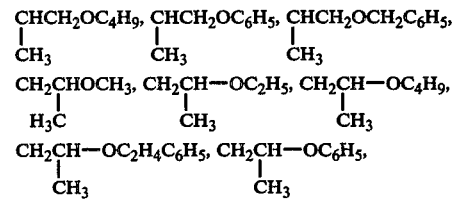

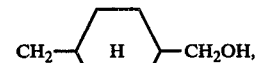

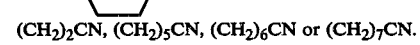

$(CH_2)_2CN$, $(CH_2)_5CN$, $(CH_2)_6CN$ or $(CH_2)_7CN$.

(2) optionally substituted cycloalkyl and polycycloalkyl:

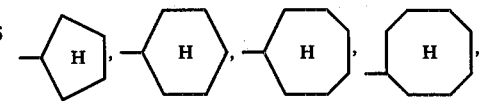

-continued

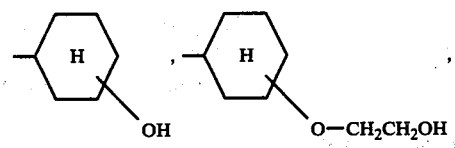

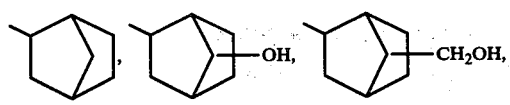

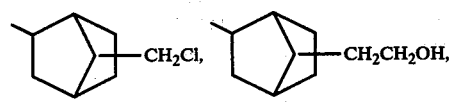

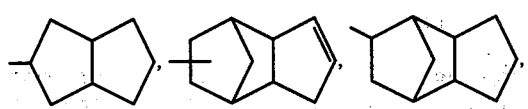

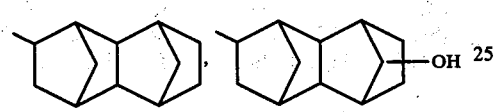

(3) aralkyl: $CH_2C_6H_5$, $C_2H_4C_6H_5$,

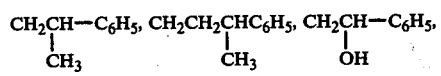

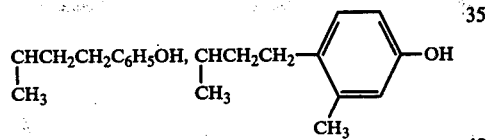

and $C_6H_4CH_3$ instead of $C_6H_5$.

(4) optionally substituted phenyl: $C_6H_5$, $C_6H_4CH_3$, $C_6H_3(CH_3)_2$, $C_6H_4OCH_3$, $C_6H_4OC_2H_5$,

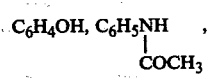

$C_4H_4OCH_2CH_2OH$ or $C_6H_4Cl$.

(5) $CH_2CH=CH_2$, $(CH_2)_2COOH$, $(CH_2)_5COOH$ and

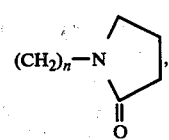

in which n is 2, 3, 4 or 6, $C_2H_4OCOCH_3$, $C_2H_4OCHO$, $C_2H_4OCOCH_2COCH_3$, $(C_2H_4O)_2COOH_3$, $(C_2H_4O)_2CHO$, $(CH_2)_3OCOCH_3$, $(CH_2)_3OCHO$, $C_2H_4OCOC_2H_4COOH$.

Examples of radicals R to $R^3$ containing sulfonic acid groups are (in addition to $SO_3H$): $CH_2CH_2SO_3H$, $CH_2CH_2OSO_3H$, $(CH_2)_3OSO_3H$,

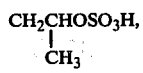

$(CH_2)_4OSO_3H$, $(CH_2)_6OSO_3H$,

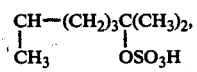

$(CH_2)_2O(CH_2)_2OSO_3H$, $(CH_2)_3O(CH_2)_2OSO_3H$, $(CH_2)_3O(CH_2)_4OSO_3H$, $(CH_2)_3OC_2H_4OCH_2C_6H_4SO_3H$, $(CH_2)_3OC_2H_4OC_2H_4C_6H_4SO_3H$, $(CH_2)_3OC_2H_4OC_6H_4SO_3H$, $CH_2CH_2OC_6H_4SO_3H$, $(CH_2)_3OC_6H_4SO_3H$, $(CH_2)_3OCH_2C_6H_4SO_3H$, $(CH_2)_3OC_2H_4C_6H_4SO_3H$,

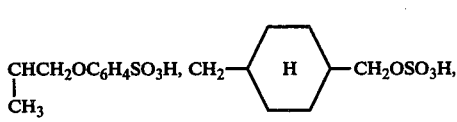

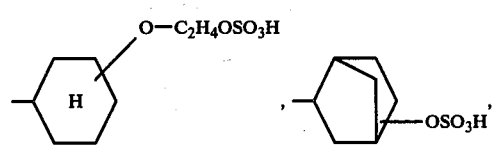

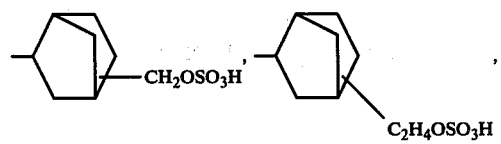

$CH_2C_6H_4SO_3H$, $C_2H_4C_6H_4SO_3H$,

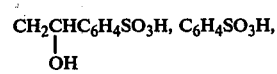

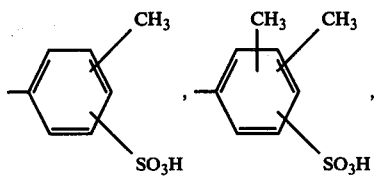

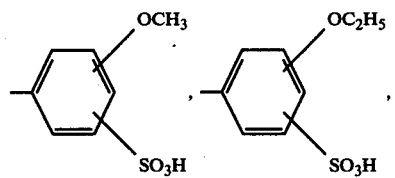

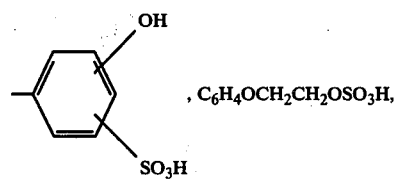

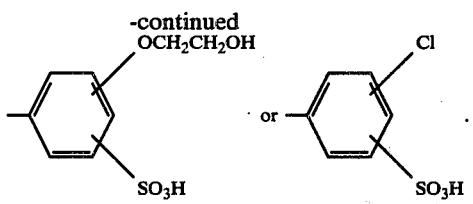

Examples of substituents R to R³ which are preferred are: hydrogen, CH₃, C₂H₅, n—C₃H₇, i—C₃H₇, n—C₄H₉, i—C₄H₉, C₆H₁₃, CH₂CH₂OH, (CH₂)₃OH,

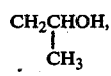

(CH₂)₄OH, (CH₂)₆OH,

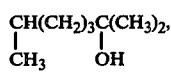

(CH₂)₂O(CH₂)₂OH, (CH₂)₃O(CH₂)₂OH, (CH₂)₃O(CH₂)₄OH, (CH₂)₃O(CH₂)₆OH,

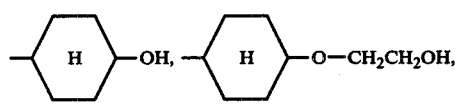

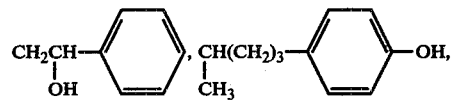

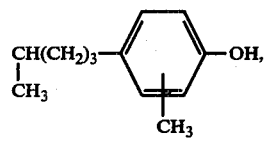

CH₂CH₂OCH₃, CH₂CH₂OC₂H₅, CH₂CH₂OC₄H₉, (CH₂)₃OCH₃, (CH₂)₃OC₂H₅, (CH₂)₃OC₃H₇, (CH₂)₃OC₄H₉, (CH₂)₃OC₆H₁₃, (CH₂)₃OC₈H₁₇,

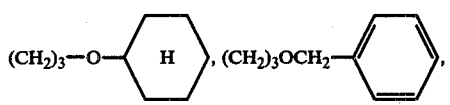

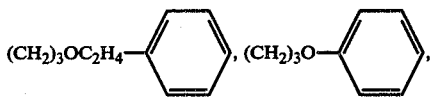

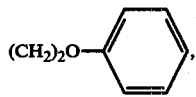

(CH₂)₃OC₂H₄OCH₃, (CH₂)₃OC₂H₄OC₄H₉, (CH₂)₃OC₂H₄OC₆H₅,

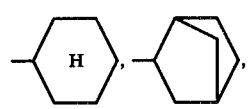

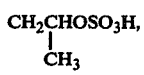

CH₂C₆H₅, C₂H₄C₆H₅,

CH₂CHC₆H₅, CH₂CH₂CHC₆H₅,
|                  |
CH₃              CH₃

C₆H₅, C₆H₄CH₃, C₆H₃(CH₃)₂, C₆H₄OCH₃, C₆H₄OC₂H₅, C₆H₄OC₂H₄OH, C₆H₄Cl, CH₂CH₂SO₃H, CH₂CH₂OSO₃H, (CH₂)₃OSO₃H,

CH₂CHOSO₃H
|
CH₃

(CH₂)₄OSO₃H, (CH₂)₆OSO₃H, (CH₂)₂O(CH₂)₂OSO₃H, (CH₂)₃O(CH₂)₂OSO₃H, (CH₂)₃O(CH₂)₄OSO₃H, (CH₂)₃O(CH₂)₆OSO₃H, (CH₂)₃OC₆H₄SO₃H, (CH₂)₃OCH₂C₆H₄SO₃H, (CH₂)₃OC₂H₄C₆H₄SO₃H, CH₂C₆H₄SO₃H, C₂H₄C₆H₄SO₃H,

CH₂CHC₆H₄SO₃H, C₆H₄SO₃H,
|
CH₃

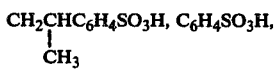

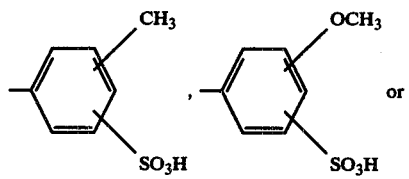

Dyes are also preferred in which two radicals R together with the nitrogen form the radical of pyrrolidine, piperidine or morpholine.

The dyes of formula (I) may be prepared or used in the form of the free acids or conveniently as water-soluble salts, for example as alkali metal, ammonium or substituted ammonium salts. Examples of substituted ammonium cations in the salts are trimethylammonium, methoxyethylammonium, hexoxypropylammonium or dimethylphenylbenzylammonium.

Dyes of formula (I) may be prepared by reacting a diazo compound of an amine of formula (V):

D—NH₂         (V)

with a coupling component of formula (VI):

H—A           (VI),

D and/or HA normally containing at least one sulfonic acid group. Diazotization and coupling are carried out by conventional methods. The new dyes, particularly those having sulfuric acid hemiester groups may also be obtained by first preparing the compounds devoid of SO₃H groups and then converting these with a sulfonating agent such as concentrated sulfuric acid, sulfuric acid monohydrate or oleum into the dye of formula (I). The Examples may be referred to for details. Coupling components of the formula H—A and their production are known from German Laid Open Specification No. 22 02 820.

Examples of compounds of the formula (V) are: aniline, 2-chloroaniline, 3-chloroaniline, 4-chloroaniline, 2-bromoaniline, 3-bromoaniline, 4-bromoaniline, 2-nitroaniline, 3-nitroaniline, 4-nitroaniline, 2-toluidine, 3-toluidine, 4-toluidine, 2-cyanoaniline, 3-cyanoaniline, 4-cyanoaniline, 2,4-dicyanoaniline, 3,4-dichloroaniline, 2,5-dichloroaniline, 2,4,5-trichloroaniline, 2,4,6-trichloroaniline, 2-chloro-4-nitroaniline, 2-bromo-4-nitroaniline, 2-cyano-4-nitroaniline, 2-methylsulfonyl-4-nitroaniline, 4-chloro-2-nitroaniline, 4-methyl-2-nitroaniline, 2-methoxy-4-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamide or β-methoxyethylamide, 1-aminobenzene-4-methylsulfone, 1-amino-2,6-dibromobenzene-4-methylsulfone, 1-amino-2,6-dichlorobenzene-4-methylsulfone, the methyl, propyl, β-methoxyethyl or butyl ester of 3,5-dichloroanthranilic acid, the methyl, ethyl, n-propyl, isopropyl, n-butyl, isobutyl, or β-methoxyethyl ester of 3,5-dibromoanthranilic acid, N-acetyl-p-phenylenediamine, N-acetyl-m-phenylenediamine, N-benzenesulfonyl-p-phenylenediamine, 4-aminoacetophenone, 4-aminobenzophenone, 2-aminobenzophenone, 2-aminodiphenylsulfone, 4-aminodiphenylsulfone, the methyl, ethyl, propyl, butyl, isobutyl, β-methoxyethyl, β-ethoxyethyl, methyl diglycol, ethyl diglycol or methyl triglycol ester of 2-aminobenzoic acid or 3-aminobenzoic acid or 4-aminobenzoic acid, 3-aminophthalic acid, 4-aminophthalic acid, the dimethyl, diethyl, dipropyl or dibutyl ester of 5-aminoisophthalic or aminoterephthalic acid, the amide, methylamide, propylamide, butylamide, isobutylamide, cyclohexylamide, β-ethylhexylamide or γ-methoxypropylamide of 3-aminobenzoic acid or 4-aminobenzoic acid, the dimethylamide, diethylamide, pyrrolidide or morpholide of 2-aminobenzoic acid, 3-aminobenzoic acid or 4-aminobenzoic acid, the diamide of 5-aminoisophthalic acid, the imide, β-hydroxyethylimide, methylimide, ethylimide or tolylimide of 3-aminophthalic acid or 4-aminophthalic acid, the dimethylamide, diethylamide, pyrrolidide or morpholide of 4-aminobenzenesulfonic acid, the hydrazide of 3-aminophthalic acid or 4-aminophthalic acid, the ethylimide, butylimide or methoxyethylimide or 4-aminonaphthalic acid, 1-aminoanthraquinone, 4-aminodiphenylene oxide, 2-aminobenzothiazole, 4-nitronaphthylamine, 5-nitronaphthylamine, 4-aminoazobenzene, 2',3-dimethyl-4-aminoazobenzene, 3',2 dimethyl-4-aminoazobenzene, 2,5-dimethyl-4-aminoazobenzene, 2-methyl-5-methoxy-4-aminoazobenzene, 2-methyl-4',5'-dimethoxy-4-aminoazobenzene, 4'-chloro-2-methyl-5-methoxy-4-aminoazobenzene, 4'-nitro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-nitro-2,5-dimethoxy-4-aminoazobenzene, 4'-chloro-2,5-dimethyl-4-aminobenzene, 4'-methoxy-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, 1-aminobenzene-2-sulfonic acid, 1-aminobenzene-3-sulfonic acid, 1-aminobenzene-4-sulfonic acid, 1-aminobenzene-2,4-disulfonic acid, 1-aminobenzene-2,5-disulfonic acid, 1-amino-2-methylbenzene-4-sulfonic acid, 1-amino-3-methylbenzene-4-sulfonic acid, 1-amino-4-methylbenzene-2-sulfonic acid, 1-amino-4-methylbenzene-3-sulfonic acid, 2-nitroaniline-4-sulfonic acid, 4-nitroaniline-2-sulfonic acid, 2-chloroaniline-4-sulfonic acid, 2-chloroaniline-5-sulfonic acid, 3-chloroaniline-6-sulfonic acid, 4-chloroaniline-2-sulfonic acid, 1-amino-3,4-dichlorobenzene-6-sulfonic acid, 1-amino-2,5-dichlorobenzene-4-sulfonic acid, 1-amino-4-methyl-5-chlorobenzene-2-sulfonic acid, 1-amino-3-methyl-4-chlorobenzene-6-sulfonic acid 2-amino-4-sulfobenzoic acid, 1-amino-4-acetaminobenzene-2-sulfonic acid, 1-amino-5-acetaminobenzene-2-sulfonic acid, 1-amino-2-methoxy-4-nitrobenzene-5-sulfonic acid, 1-aminoanthraquinone-2-sulfonic acid, 1-aminonaphthalene-2-sulfonic acid, 1-aminonaphthalene-4-sulfonic acid, 2-aminonaphthalene-1-sulfonic acid, and the diazo components of the formulae:

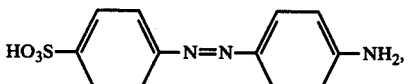

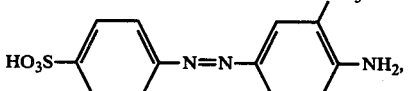

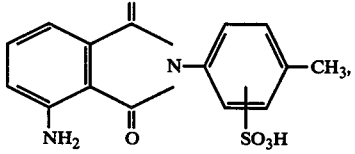

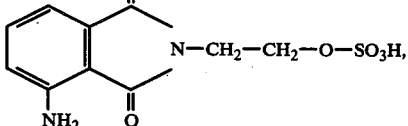

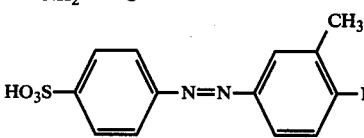

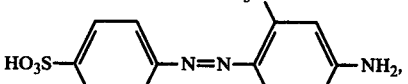

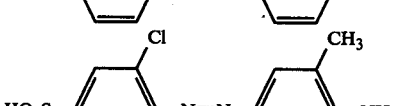

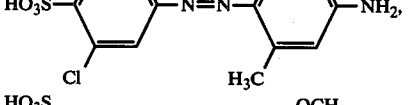

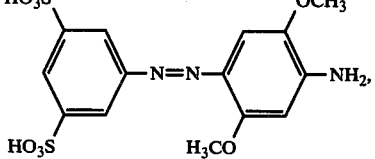

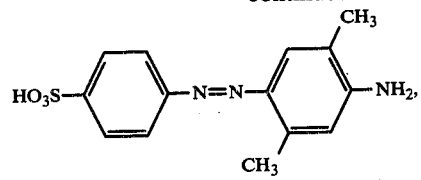
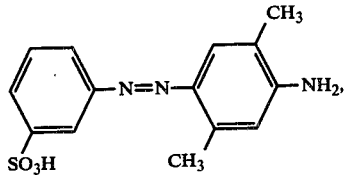
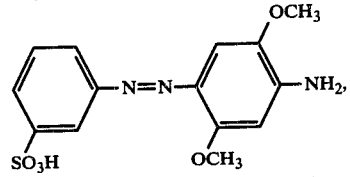
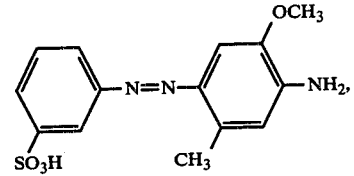
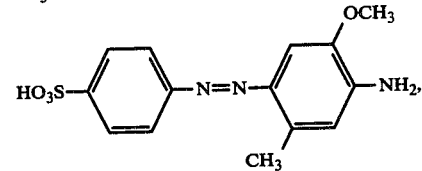
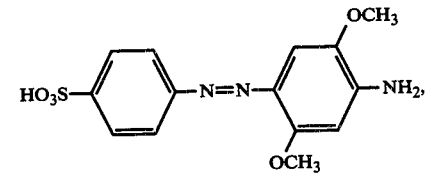
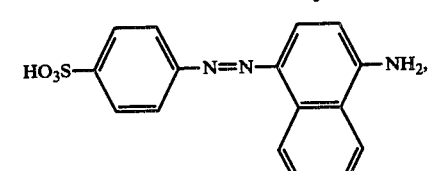
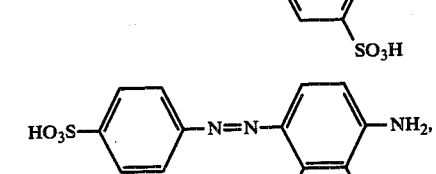
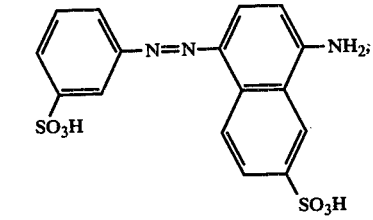
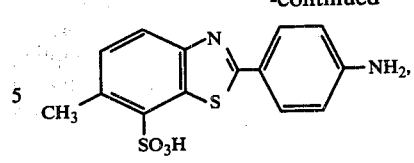
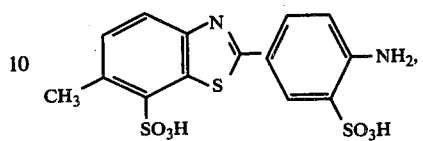
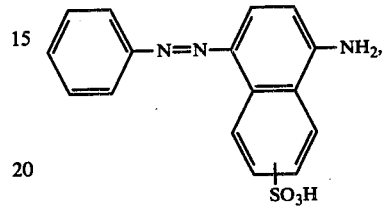
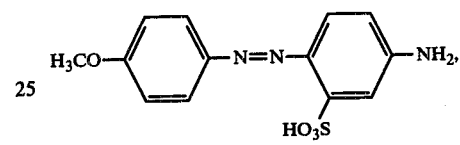
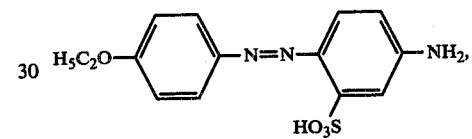
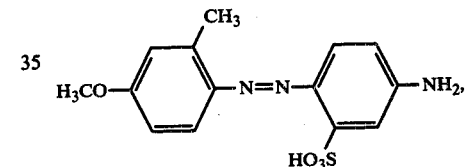
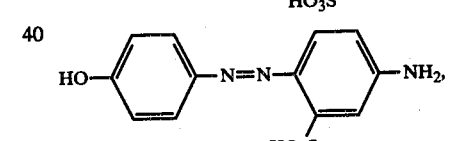
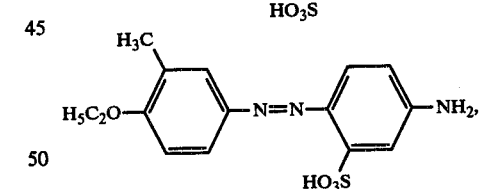
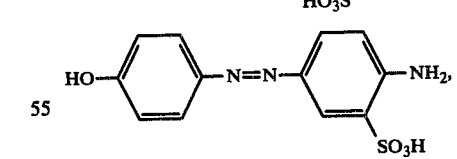
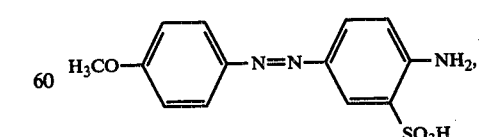
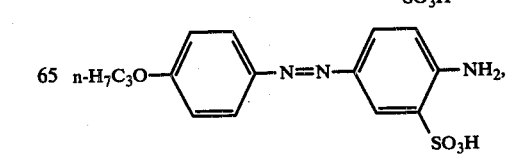

-continued
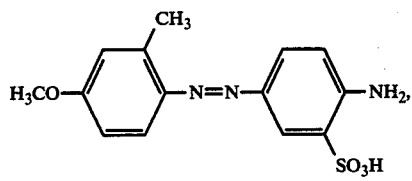
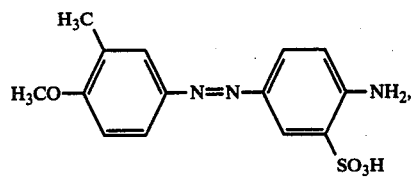
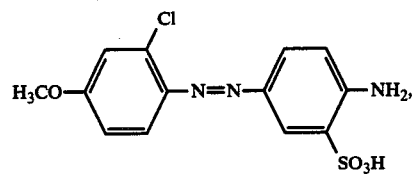
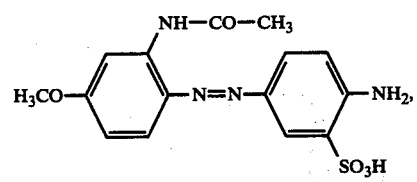
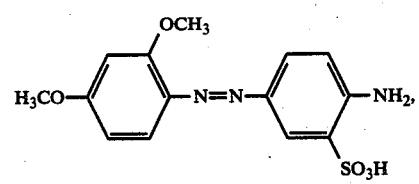
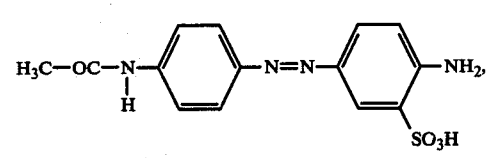
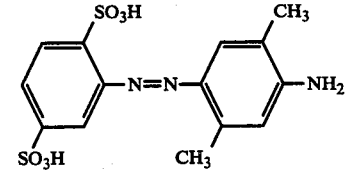
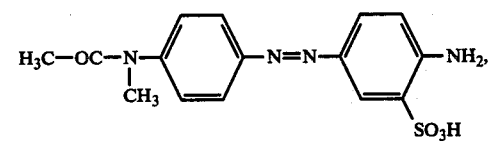
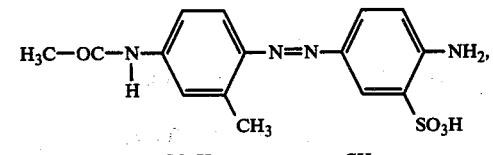
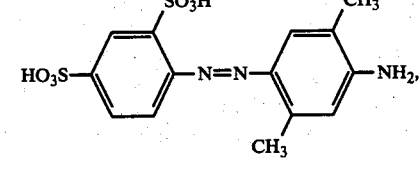
-continued
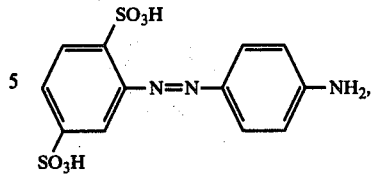
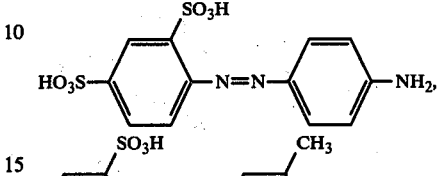
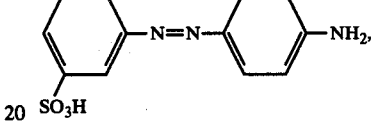
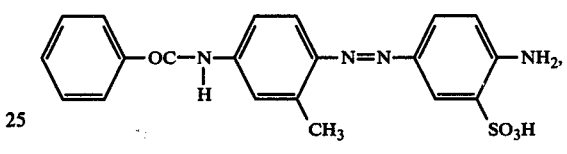
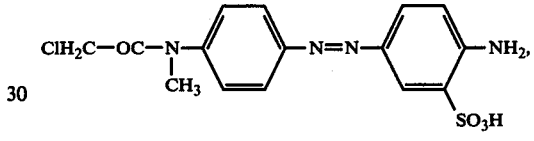
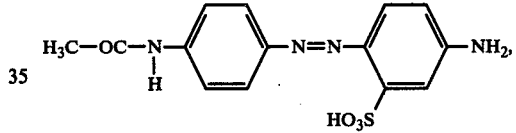
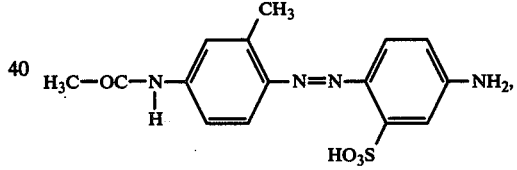
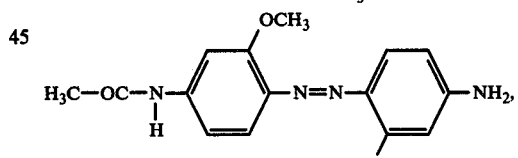
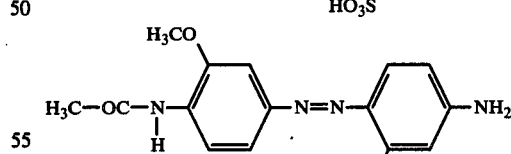
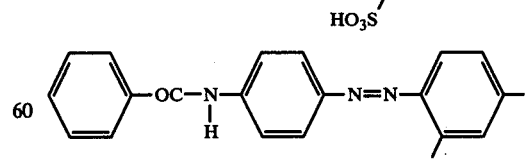
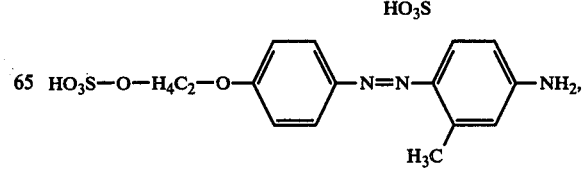

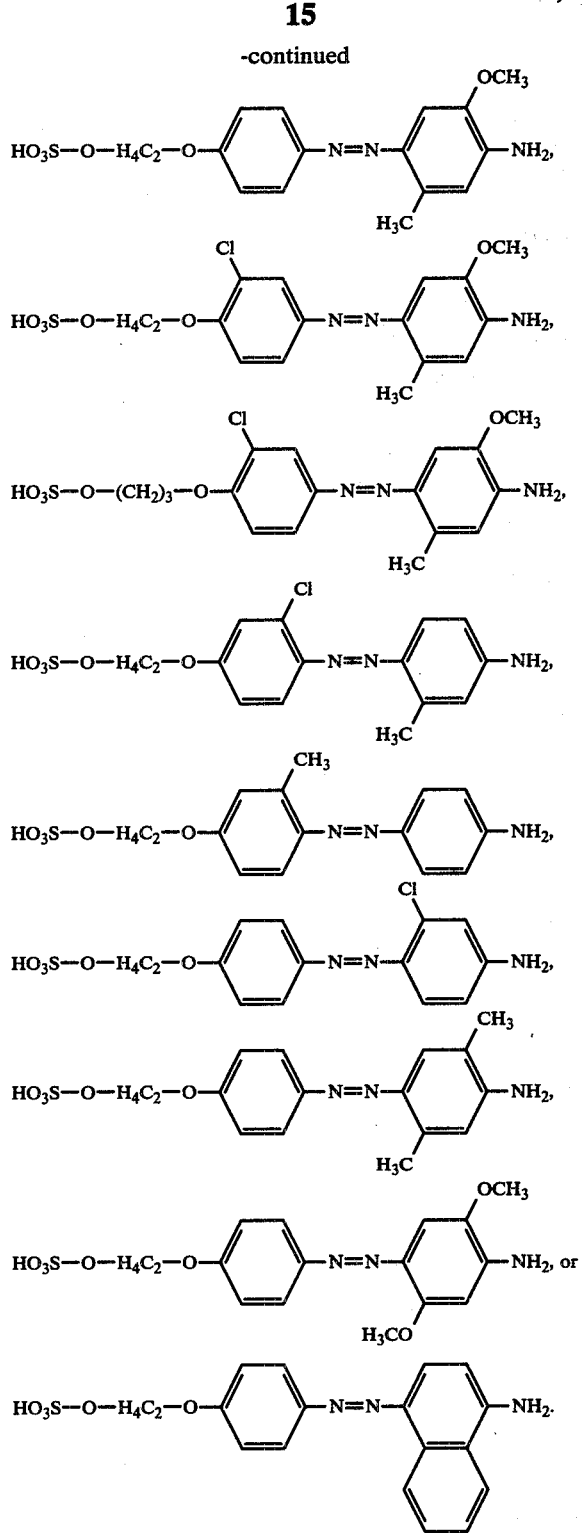

Particular industrial significance attaches to dyes of the formula (Ia):

$$D^1-N=N-A^1 \quad (Ia)$$

in which $D^1$ is:

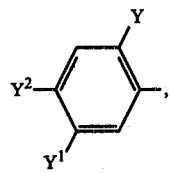

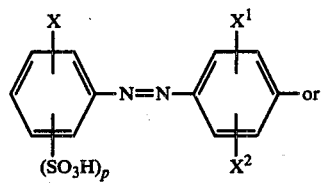

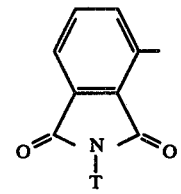

p is zero or 1;
Y is hydrogen, cyano, chloro, bromo, methylsulfone, ethylsulfone, phenylsulfone, carbalkoxy or $SO_3H$;
$Y^1$ is hydrogen, chloro, bromo or $SO_3H$;
$Y^2$ is hydrogen, chloro, bromo, methyl, carbalkoxy, 2-benzothiazolyl or $SO_3H$;
X is hydrogen, methyl, hydroxy, methoxy or $SO_3H$;
$X^1$ is hydrogen, methyl, methoxy or $SO_3H$;
$X^2$ is hydrogen, methyl or methoxy;
T is hydrogen or a substituent; and
$A^1$ has the above meanings.

Preferred radicals T are alkyls of two to eight carbon atoms which may be interrupted by oxygen and may bear hydroxy, phenoxy or $OSO_3H$ as a substituent, benzyl, benzyl bearing $SO_3H$ as a substituent, phenylethyl, phenylethyl bearing $SO_3H$ as a substituent, and phenyl which may bear $SO_3H$ and/or other radicals as a substituent.

Examples of radicals T are: $CH_3$, $C_2H_5$, $C_3H_7$, $C_4H_9$, $C_6H_{13}$,

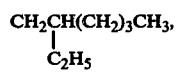

$CH_2CH_2OH$, $(CH_2)_3OH$, $CH_2CH_2OCH_2CH_2OH$, $(CH_2)_3O(CH_2)_4OH$, $CH_2CH_2OC_6H_5$, $CH_2CH_2OSO_3H$, $(CH_2)_3OSO_3H$, $CH_2CH_2OCH_2CH_2OSO_3H$, $(CH_2)_3O(CH_2)_4OSO_3H$, $CH_2C_6H_5$, $CH_2C_6H_4SO_3H$, $C_2H_4C_6H_5$, $C_2H_4C_6H_4SO_3H$, $C_6H_5$, $C_6H_4SO_3H$,

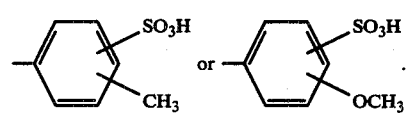

Preferred radicals for R and $R^3$ in the radicals $A^1$ in dyes of the formula (Ia) are alkyl of one to eight carbon atoms which may be interrupted by oxygen and may bear hydroxy, phenoxy, benzoyloxy or $OSO_3H$ as a substituent, benzyl, phenylethyl or benzyl or phenylethyl bearing $SO_3H$ as a substituent, unsubstituted or substituted phenyl or hydroxysulfonylphenyl radicals or hydrogen. Preferred also are dyes in which the radical $A^1$ corresponds to the formula (IVb) and in which R and $R^1$ together with the nitrogen form the radical of pyrrolidine, piperidine or morpholine.

The $SO_3H$ groups may be situated preferably either only in the radical D or only in the radical Z, particularly when Z contains a phenyl radical.

Examples of preferred diazo components are: the methyl, ethyl, n-propyl, isopropyl, β-methoxyethyl esters of 2-aminobenzoic, 3-aminobenzoic and 4-aminobenzoic acid, the methyl, ethyl or isopropyl ester of 2-amino-3,5-dichlorobenzoic acid, the methyl, ethyl or β-methoxyethyl ester of 2-amino-3,5-dibromobenzoic acid, ethyl 3-bromo-4-aminobenzoate, diethyl aminoterephthalate, 2-aminobenzonitrile, 2,4-dicyanoaniline, 2-amino-5-chlorobenzonitrile, 2-amino-5-bromobenzonitrile, 2-amino-3-bromo-5-chlorobenzonitrile, 2-amino-3,5-dibromobenzonitrile, 2-amino-3,5-dichlorobenzonitrile, 2-amino-1-trifluoromethylbenzene, 2-amino-5-chlorotrifluoromethylbenzene, 4-aminobenzene-1-methylsulfone, 3-chloro-4-aminobenzene-1-methylsulfone, 2-aminodiphenylsulfone, 4-aminodiphenylsulfone, the β-hydroxyethylimide of 3-aminophthalic or 4-aminophthalic acid, the β-methoxyethylimide of 3-aminophthalic or 4-aminophthalic acid, the butylimide or tolylimide of 3-aminophthalic acid or 4- aminophthalic acid, 1-amino-4-nitrobenzene, 1-amino-4-acetylaminobenzene, 1-amino-3-acetylaminobenzene, 4-aminobenzoic acid amide, the N-methylamide, N-butylamide or N-β-ethylhexylamide of 4-aminobenzoic acid, the N,N-diethylamide of 4-aminobenzoic acid, the amide of 3-aminobenzenesulfonic acid or 4-aminobenzenesulfonic acid, the N-butylamide of 2-aminobenzenesulfonic acid or 4-aminobenzenesulfonic acid, the morpholide of 3-aminobenzenesulfonic acid or 4-aminobenzenesulfonic acid, 2-chloroaniline-4-sulfonic acid, 2-chloroaniline-5-sulfonic acid, 3-chloroaniline-6-sulfonic acid, 4-chloroaniline-2-sulfonic acid, 1-amino-3,4-dichlorobenzene-6-sulfonic acid, 1-amino-2,5-dichlorobenzene-4-sulfonic acid, 1-amino-2,5-dibromobenzene-4- sulfonic acid, 1-amino-4-methyl-5-chlorobenzene-2-sulfonic acid, 1-amino-3-methyl-4-chlorobenzene-6-sulfonic acid and the amines of the formulae:

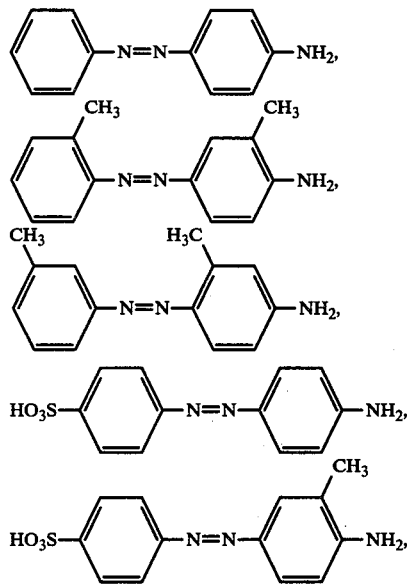

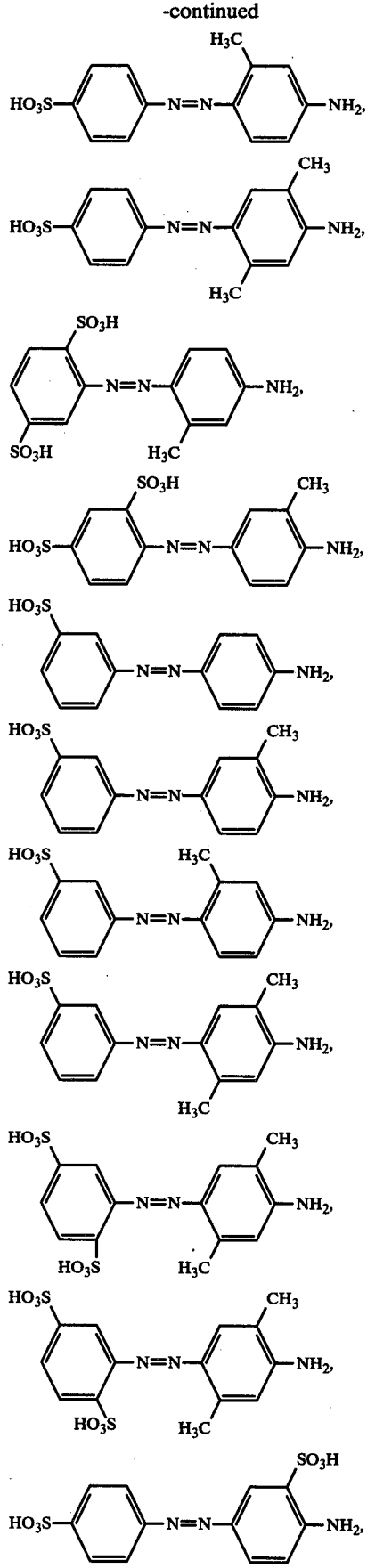

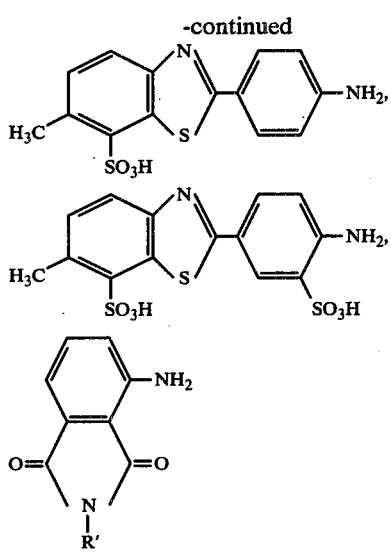

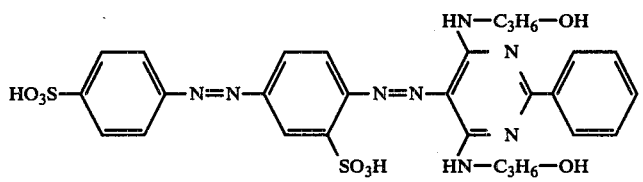

E = H, CH₃, C₂H₅.

The new dyes are yellow to violet, have very high color strength and are suitable for dyeing natural and synthetic polyamides such as wool, silk, nylon 6 or nylon 6,6. Brilliant colorations having excellent fastness properties are obtained with them. Individual fastness properties which should be mentioned are those given in the Color Index for Acid Dyes, in particular light fastness, fastness to rubbing milling, perspiration, potting, water, sea water and washing. The dyes also have very good solubilities, good levelling power and build-up, and the dyeing behavior is essentially independent of the pH.

The following Examples illustrate the invention. References to parts and percentages in the following Examples are by weight unless stated otherwise.

EXAMPLE 1

18 parts of 4-aminoazobenzene-3,4'-disulfonic acid is dissolved in 125 parts by volume of water while hot with an addition of 4 parts of sodium hydroxide. The calculated amount of a 23% sodium nitrite solution is added and then the whole is then added to a mixture of 15 parts by volume of concentrated hydrochloric acid, 100 parts by volume of water and 150 parts of ice. The suspension is stirred for another three hours to complete the diazotization and then added to a solution of 15 parts of 2-phenyl-4,6-bis-γ-hydroxypropylaminopyrimidine in 100 parts by volume of dimethylformamide and 500 parts by volume of ice water. After a pH of 4 to 5 has been set up the mixture is stirred until coupling is completed. The dye of the formula:

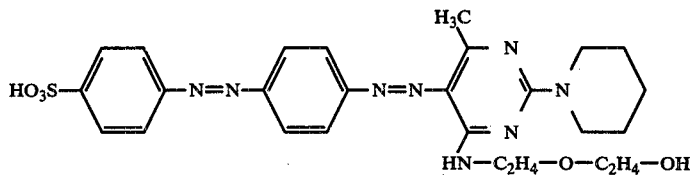

is then precipitated with common salt, filtered, washed with a dilute solution of common salt and dried. The product dyes polyamide material, for example fibers of poly-ε-caprolactam red hues having very good fastness to light and wet treatment.

EXAMPLE 2

8.3 parts of 4-aminoazobenzene-4'-sulfonic acid is dissolved neutral in 75 parts by volume of water at 70° C., 9 parts by volume of a 23% sodium nitrite solution is added and the solution obtained is then cooled by adding ice to 10° C. The mixture is then acidified with 9 parts by volume of concentrated hydrochloric acid and stirred at ambient temperature until diazotization is over. The suspension is then added to 9.2 parts of 2-piperidino-4-methyl-6-hydroxyethoxyethylaminopyrimidine which has previously been dissolved in 100 parts by volume of formamide, 20 parts by volume of dilute hydrochloric acid and 500 parts by volume of ice-water. Coupling is carried out at a pH of 6.5 to 7. After the reaction is over the pH of the solution is adjusted to 8, the dye which in the form of the free acid corresponds to the formula:

is precipitated with sodium chloride and isolated in the usual way. An orange brown powder is obtained which colors polyamide orange hues having good light and wet fastness properties.

EXAMPLE 3

A solution of 12 parts of 2,5-dichlorosulfanilic acid in 120 parts by volume of dilute caustic soda solution (pH 8) is united with the calculated amount of a 23% sodium nitrite solution and added to 9 parts by volume of concentrated hydrochloric acid and 100 parts of ice. Diazotization is over within two hours at 0° to 5° C. The suspension obtained is added to a mixture of 8.6 parts of 2-phenyl-4-β-hydroxyethylamino-6-β-methoxyethylaminopyrimidine (previously dissolved in dilute hydrochloric acid) and 200 parts of ice and the whole is adjusted with 10% caustic soda solution to a pH of 6 to 7 and stirred overnight. The deposited dye is brought into solution by heating at pH 10, the dye salt is precipitated with sodium chloride, filtered off and dried. The dye in the form of the free acid corresponds to the formula:

it dyes polyamide materials yellow hues of outstanding light and wet fastness properties.

EXAMPLE 4

9 parts of the coupling product of sulfanilic acid and 2,5-dimethylaniline is diazotized in the usual way in 200 parts by volume of water in the presence of 10 parts by volume of concentrated hydrochloric acid with sodium nitrite at ambient temperature. The diazotization mixture is then coupled with a solution of 8.6 parts of 2-phenyl-4-β-hydroxyethylamino-6-β-methoxyethylaminopyrimidine in 100 parts by volume of formamide and 250 parts of ice, the pH being adjusted to 5.5 and the mixture stirred until coupling is over. The deposited dye is then filtered off, dissolved in dilute caustic soda solution, again precipitated with sodium chloride, filtered off and dried. The compound corresponds in the form of the free acid to the formula:

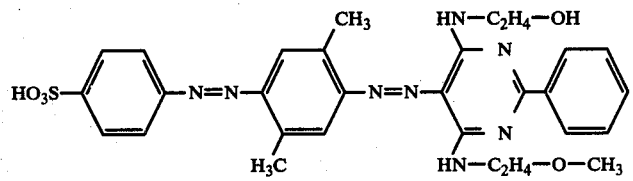

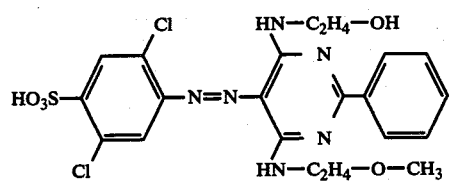

It dyes polyamide materials yellowish red hues of outstanding fastness properties.

The following dyes are also prepared by methods analogous to those described in the foregoing Examples.

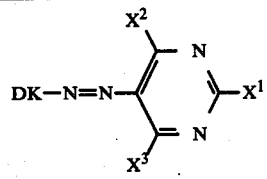

| Ex. No. | DK | $X^1$ | $X^2$ | $X^3$ | Hue of dyeing on polyamide |
|---|---|---|---|---|---|
| 5 | Cl, HO₃S– (substituted phenyl) | –phenyl | NHC₂H₄OCH₃ | NHC₂H₄OCH₃ | yellow |
| 6 | " | " | NHC₂H₄OH | NHC₂H₄OH | yellow |
| 7 | " | " | CH₃ | NH(CH₂)₃OCH₃ | yellow |
| 8 | " | –N(piperidine) | " | NHC₂H₄OH | yellow |
| 9 | " | " | " | " | yellow |
| 10 | Cl, SO₃H (substituted phenyl) | " | " | NH(CH₂)₃OCH₃ | yellow |
| 11 | " | –phenyl | NHC₂H₄OCH₃ | NHC₂H₄OCH₃ | yellow |
| 12 | " | " | NHC₂H₄OH | NHC₂H₄OH | yellow |
| 13 | " | " | " | " | yellow |
| 14 | Cl, SO₂H (substituted phenyl) | " | NHC₂H₄OCH₃ | NHC₂H₄lOCH₃ | yellow |

-continued $$DK-N=N-\underset{\underset{X^3}{\overset{X^2}{\nwarrow}}}{\overset{N}{\underset{N}{\diagdown}}}X^1$$

| Ex. No. | DK | $X^1$ | $X^2$ | $X^3$ | Hue of dyeing on polyamide |
|---|---|---|---|---|---|
| 15 | " | —N(piperidinyl) | $CH_3$ | $NH(CH_2)_3OCH_3$ | yellow |
| 16 | " | " | " | $NHC_2H_4OH$ | yellow |
| 17 | 4-Cl-3-CH₃-C₆H₃-SO₃H (HO₃S with Cl) | " | " | " | yellow |
| 18 | " | " | " | $NH(CH_2)_3OCH_3$ | yellow |
| 19 | " | —C₆H₄— (phenyl) | $NHC_2H_4OCH_3$ | $NHC_2H_4OCH_3$ | yellow |
| 20 | " | " | $NHC_2H_4OH$ | $NHC_2H_4OH$ | yellow |
| 21 | 5-CH₃-4-Cl-2-SO₃H-phenyl | " | " | " | yellow |
| 22 | " | " | $NHC_2H_4OCH_3$ | $NHC_2H_4OCH_3$ | yellow |
| 23 | 4,5-diCl-2-SO₃H-phenyl | " | " | $NHC_2H_4OH$ | yellow |
| 24 | " | —N(piperidinyl) | $CH_3$ | $NH(C_2H_4O)_2H$ | yellow |
| 25 | 2,5-diCl-4-SO₃H-phenyl (HO₃S-, Cl, Cl) | —C₆H₄— | $NHC_2H_4OH$ | $NHC_2H_4OH$ | yellow |
| 26 | " | " | $NH(CH_2)_3OH$ | $NH(CH_2)_3OH$ | yellow |
| 27 | " | " | $NHC_2H_4OCH_3$ | $NHC_2H_4OCH_3$ | yellow |
| 28 | " | " | $NH(CH_2)_3OCH_3$ | $NH(CH_2)_3OCH_3$ | yellow |
| 29 | " | " | $NHC_2H_4OH$ | $NHC_2H_5$ | yellow |
| 30 | " | " | " | $NHC_4H_9$ | yellow |
| 31 | " | " | " | $NH_2$ | yellow |
| 32 | " | " | " | $NHCH(CH_3)(CH_2)_3C(CH_3)_2OH$ | yellow |
| 33 | " | " | " | " | yellow |
| 34 | " | " | $NH_2$ | $NH(CH_2)_3OCH_3$ | yellow |
| 35 | " | " | $NHC_2H_4OH$ | $NH(CH_2)_3OC_3H_7(i)$ | yellow |
| 36 | " | " | $NH_2$ | $NH(CH_2)_3O(CH_2)_4OH$ | yellow |
| 37 | " | " | $NHC_2H_4OH$ | $NH-C_6H_{11}$ (cyclohexyl) | yellow |
| 38 | " | " | " | $NH-C_6H_9$ (cyclohexenyl) | yellow |
| 39 | " | " | " | $NH(CH_2)_3OCH_2C_6H_5$ | yellow |
| 40 | " | " | " | $NHCH_2C_6H_5$ | yellow |
| 41 | " | " | $NH(CH_2)_3OH$ | " | yellow |
| 42 | " | " | $NHC_2H_4OH$ | $NHCH_2CH(CH_3)C_6H_5$ | yellow |
| 43 | " | " | " | $NHC_6H_5$ | yellow |
| 44 | " | " | $NH(C_2H_4O)_2H$ | " | yellow |
| 45 | " | —C₆H₄—CH₃ (tolyl) | $NHC_2H_4OH$ | $NHC_2H_4OH$ | yellow |

-continued

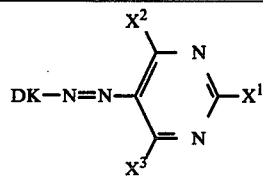

| Ex. No. | DK | $X^1$ | $X^2$ | $X^3$ | Hue of dyeing on polyamide |
|---|---|---|---|---|---|
| 46 | " | " | $\underset{H}{N}(CH_2)_3OH$ | $NH(CH_2)_3OC_3H_7(i)$ | yellow |
| 47 | " | —⌬—$OCH_3$ | $\underset{H}{N}(CH_2)_3OH$ | $NH)_2)_3OCH_3$ | yellow |
| 48 | " | —⌬—$OC_2H_5$ | $NHC_2H_4OH$ | $NH(CH_2)_3OC_3H_7(i)$ | |
| 49 | " | —⌬—$Cl$ | $NH(C_2H_4O)_2H$ | $NH(C_2H_4O)_2H$ | yellow |
| 50 | " | —H | $NH(CH_2)_3OH$ | $NH(CH_2)_3OCH_3$ | yellow |
| 51 | " | —$CH_3$ | $NHC_2H_4OCH_3$ | $NHC_2H_4OCH_3$ | yellow |
| 52 | " | " | $NH(CH_2)_3OH$ | $NHCH_2\underset{OH}{C}HC_6H_5$ | yellow |
| 53 | " | —$CH(CH_3)_2$ | $NH(CH_2)_3OCH_3$ | $NH(CH_2)_3OCH_3$ | yellow |
| 54 | " | —$C_4H_9$ | $NH(CH_2)_3OH$ | $NH(CH_2)_3OH$ | yellow |
| 55 | " | —$\underset{C_2H_5}{C}HC_4H_9$ | " | " | yellow |
| 56 | " | —$CH_2$—⌬ | " | " | yellow |
| 57 | " | —$CH_2OCH_2H_5$ | " | " | yellow |
| 58 | " | —$CH_2$—O—⌬ | " | " | yellow |
| 59 | " | —$N(C_2H_5)_2$ | H | $NHC_6H_5$ | yellow |
| 60 | " | —N⌬ (piperidyl) | $CH_3$ | $NHC_2H_4OH$ | yellow |
| 61 | " | " | " | $NH(C_2H_4O)_2H$ | yellow |
| 62 | " | " | " | $NH(CH_2)_3OH$ | yellow |
| 63 | " | " | " | $NH(CH_2)_3OCH_3$ | yellow |
| 64 | " | " | " | $NHCH_2C_6H_5$ | yellow |
| 65 | " | " | " | $NHC_2H_4C_6H_5$ | yellow |
| 66 | naphthyl-$SO_3H$ (2-methyl-1-naphthyl) | $N(C_2H_5)_2$ —⌬ | $NHC_2H_4OH$ | $NHC_2H_4OH$ | yellowish orange |
| 67 | $H_3C$—CO—HN—⌬—$SO_3H$, $CH_3$ | " | " | " | yellow |
| 68 | $HO_3S$—⌬—$CH_3$, $SO_3H$ | " | " | " | yellow |
| 69 | ⌬—$SO_3H$ | " | " | " | yellow |
| 70 | $H_3C$—benzothiazolyl-tolyl—$SO_3H$ | " | " | $NHC_4H_9$ | orange |
| 71 | " | —N⌬ (piperidyl) | $CH_3$ | $NHC_2H_4OH$ | yellow |
| 72 | $H_3C$—benzothiazolyl—⌬—$SO_3H$, $SO_3H$ | —⌬ | $NHC_2H_4OH$ | $NHC_2H_4OH$ | reddish orange |
| 73 | " | " | $NH(CH_2)_3OH$ | $NH(CH_2)_3OH$ | " |
| 74 | " | " | $NH(CH_2)_3OCH_3$ | $NH(CH_2)_3OCH_3$ | " |
| 75 | " | " | $NHC_2H_4OCH_3$ | $NHC_2H_4OCH_3$ | " |

-continued

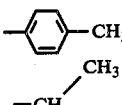

| Ex. No. | DK | $X^1$ | $X^2$ | $X^3$ | Hue of dyeing on polyamide |
|---|---|---|---|---|---|
| 76 | " | " | $NHC_2H_4OH$ | $NHC_4H_9$ | " |
| 77 | " | " | $NH(CH_2)_3OH$ | $NH(CH_2)_3OCH_3$ | " |
| 78 | " | 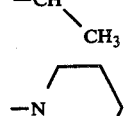 | $NH(CH_2)_3OCH_3$ | " | orange |
| 79 | " | 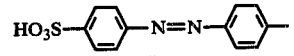 | $CH_3$ | $NHC_2H_4OH$ | orange |
| 80 | " | " | " | $NH(CH_2)_3OCH_3$ | " |
| 81 |  | 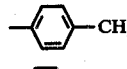 | $NHC_2H_4Oh$ | $NHC_2H_4OH$ | yellowish red |
| 82 | " | " | $NH(CH_2)_3OH$ | $NH(CH_2)_3OH$ | " |
| 83 | " | " | $NHC_2H_4OCH_3$ | $NHC_2H_4OCH_3$ | " |
| 84 | " | " | $NH(CH_2)_3OCH_3$ | $NH(CH_2)_3OCH_3$ | " |
| 85 | " | " | $NHCH_2CHCH_3$ <br>            $\|$ <br>            OH | " | " |
| 86 | " | " | $NH_2$ | $NH_2$ | orange |
| 87 | " | " | $NH(CH_2)_6OH$ | $NHC_2H_4OCH_3$ | yellowish red |
| 88 | " | " | $NH(CH_2)_3OC_2H_4OH$ | " | " |
| 89 | " | " | $NH(CH_2)_3O(CH_2)_6OH$ | " | " |
| 90 | " | " | $NHC_2H_4OH$ | $NH(CH_2)_3OCH_2C_6H_5$ | yellowish red |
| 91 | " | " | " | $NHC_4H_9$ | |
| 92 | " | 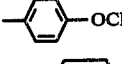 | $NH(CH_2)_3OCH_3$ | $NH(CH_2)_3OCH_3$ | " |
| 94 | " | 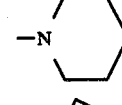 | $CH_3$ | $NH(C_2H_4O)_2COCH_3$ | orange |
| 95 | " | 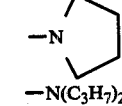 | " | " | " |
| 96 | " | $-N(C_3H_7)_2$ | " | " | " |
| 97 | 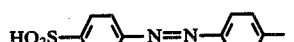 |  | $NH_2$ | $NH_2$ | " |
| 98 | " | " | $NHC_2H_4OH$ | $NHC_2H_4OH$ | red |
| 99 | " | " | $NH(C_2H_4O)_2H$ | $NH(C_2H_4O)_2H$ | " |
| 100 | " | " | $NHC_2H_4OCH_3$ | " | " |
| 101 | " | " | $NH(CH_2)_3OCH_3$ | $NH(CH_2)_3OCH_3$ | " |
| 102 | " | " | $NH_2$ | $NHCH(CH_2)_3C(CH_3)_2$ <br>       $\|$          $\|$ <br>       $CH_3$     OH | red |
| 103 | " | " | $NHC_2H_4OH$ | $NHC_2H_5$ | " |
| 104 | " | " | " | $NHC_3H_7$ | " |
| 105 | " | " | " | $NHC_3H_7$ | " |
| 105 | " | " | " | $NHC_6H_{13}$ | " |
| 106 | " | " | $NH(CH_2)_3OH$ | $NH(CH_2)_3OC_2H_4OC_2H_5$ | " |
| 107 | " | " | " | $NH(CH_2)_3OC_2H_4OC_6H_5$ | " |
| 108 | " | " | " | $NH(CH_2)_3OC_2H_5$ | " |
| 109 | " | " | " | $NH(CH_2)_3OC_2H_4C_6H_5$ | " |
| 110 | " | " | " | 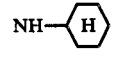 | " |
| 111 | " | " | " | 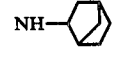 | " |

-continued

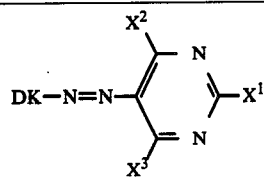

| Ex. No. | DK | X$^1$ | X$^2$ | X$^3$ | Hue of dyeing on polyamide |
|---|---|---|---|---|---|
| 112 | " | " | " | NH-[indanyl] | " |
| 113 | " | " | NH(CH$_2$)$_3$O(CH$_2$)$_4$OH | NHC$_2$H$_4$OCH$_3$ | red |
| 114 | " | " | NHC$_2$H$_4$OH | NHCH$_2$C$_6$H$_5$ | " |
| 115 | " | " | " | NHC$_2$H$_4$C$_6$H$_5$ | " |
| 116 | " | " | " | NHC$_6$H$_5$ | " |
| 117 | " | " | NH(CH$_2$)$_3$OH | NH-C$_6$H$_4$-CH$_3$ | " |
| 118 | " | -C$_6$H$_4$-CH$_3$ | NHC$_2$H$_4$OH | NHC$_4$H$_9$ | " |
| 119 | " | -C$_6$H$_4$-OCH$_3$ | NH(CH$_2$)$_3$OCH$_3$ | NH(CH$_2$)$_3$OCH$_3$ | " |
| 120 | " | -C$_6$H$_4$-Cl | NH(CH$_2$)$_3$OH | NH(CH$_2$)$_3$OH | " |
| 121 | " | -N(C$_2$H$_5$)$_2$ | H | NHC$_2$H$_4$OH | orange |
| 122 | " | " | " | NHC$_6$H$_5$ | " |
| 123 | " | -N(CH$_3$)$_2$ | CH$_3$ | NH(CH$_2$)$_3$OH | yellowish red |
| 124 | " | -N(C$_2$H$_5$)$_2$ | " | NH(CH$_2$)$_3$O(CH$_2$)$_4$OH | yellowish red |
| 125 | " | " | " | NHCH$_2$CH(OH)C$_6$H$_5$ | " |
| 126 | " | " | " | NH(CH$_2$)$_3$OCH$_2$C$_6$H$_5$ | " |
| 127 | " | " | " | NHCH(CH$_3$)(CH$_2$)$_3$C(CH$_3$)$_2$OH | " |
| 128 | " | " | " | NHCH(CH$_3$)(CH$_2$)$_3$-C$_6$H$_4$-OH | " |
| 129 | " | " | " | NHCH$_2$C$_6$H$_5$ | " |
| 130 | " | " | " | NH-C$_6$H$_4$-CH$_3$ | " |
| 131 | " | " | " | NH-C$_6$H$_4$-OC$_2$H$_4$OH | " |
| 132 | " | -N(C$_3$H$_7$)$_2$ | " | NH(CH$_2$)$_3$OH | " |
| 133 | " | " | " | NHC$_2$H$_4$C$_6$H$_5$ | " |
| 134 | " | -N(CH$_2$CH(CH$_3$)CH$_3$)$_2$ | " | NH(CH$_2$)$_3$OH | " |
| 135 | " | -N(C$_2$H$_5$)((CH$_2$)$_5$CH$_3$) | " | " | yellowish red |
| 136 | " | -N(CH$_2$CH(C$_2$H$_5$)C$_4$H$_9$)$_2$ | " | NH(C$_2$H$_4$O)$_2$H | " |
| 137 | " | -N(piperidino) | " | " | " |
| 138 | " | " | " | NH(CH$_2$)$_3$O(CH$_2$)$_4$OH | " |
| 139 | " | " | " | NHCH$_2$C$_6$H$_5$ | " |
| 140 | " | " | C$_3$H$_7$ | NH(CH$_2$)$_3$OH | " |
| 141 | " | " | CHC$_4$H$_9$(C$_2$H$_5$) CH$_3$ | " | " |
| 142 | " | -N(morpholino) | " | " | " |

-continued

DK—N=N—[pyrimidine with X¹, X², X³ substituents]

| Ex. No. | DK | X¹ | X² | X³ | Hue of dyeing on polyamide |
|---|---|---|---|---|---|
| 143 | " | " | " | " | " |
| 144 | HO₃S—C₆H₄—N=N—(2-CH₃, 5-CH₃ phenyl) | —N(pyrrolidine) phenyl | NHC₂H₄OH | NHC₂H₄OH | red |
| 145 | " | " | NH(CH₂)₃OH | NH(CH₂)₃OH | " |
| 146 | " | " | NH(C₂H₄O)₂H | NH(C₂H₄O)₂H | " |
| 147 | " | " | NHC₂H₄OCH₃ | NHC₂H₄OCH₃ | " |
| 148 | " | " | NH(CH₂)₃OCH₃ | NH(CH₂)₃OCH₃ | " |
| 149 | " | —N(piperidine) | CH₃ | NHC₂H₄OH | yellowish red |
| 150 | HO₃S—C₆H₄—N=N—(2-OCH₃, 5-CH₃ phenyl) | phenyl | NHC₂H₄OCH₃ | NH(CH₂)₃O(CH₂)₄OH | Bordeaux |
| 151 | " | —N(piperidine) | CH₃ | NHC₂H₄OH | red |
| 152 | HO₃S—C₆H₄—N=N—(2-OCH₃, 5-CH₃ phenyl) | " | " | " | Bordeaux |
| 153 | " | phenyl | NHC₂H₄OH | NHC₂H₄OCH₃ | violet |
| 154 | " | " | NHC₂H₄OCH₃ | NH(CH₂)₃O(CH₂)₄OH | " |
| 155 | HO₃S—C₆H₄(m)—N=N—(2-CH₃, 5-CH₃ phenyl) | " | " | " | yellowish red |
| 156 | " | —N(pyrrolidine) | CH₃ | NHC₂H₄OH | reddish orange |
| 157 | HO₃S—C₆H₄(m)—N=N—(2-OCH₃, 5-CH₃ phenyl) | " | " | " | red |
| 158 | " | phenyl | NHC₂H₄OH | NHC₂H₄OCH₃ | " |
| 159 | HO₃S—C₆H₄(m)—N=N—(2-OCH₃, 5-OCH₃ phenyl) | " | NHC₂H₄OCH₃ | NH(CH₂)₃O(CH₂)₄OH | violet |

-continued $$DK-N=N-\underset{\underset{X^3}{\overset{X^2}{\diagdown}}}{\overset{\diagup}{\diagdown}}\underset{N}{\overset{N}{\diagup}}X^1$$

| Ex. No. | DK | $X^1$ | $X^2$ | $X^3$ | Hue of dyeing on polyamide |
|---|---|---|---|---|---|
| 160 | " | —N(piperidinyl) | $CH_3$ | $NHC_2H_4OH$ | Bordeaux |
| 161 | $H_3C(CH_3)N$—C$_6$H$_4$—N=N—C$_6$H$_3$(SO$_3$H)— | —(phenyl) | $NHC_2H_4OH$ | $NHC_2H_4OCH_3$ | yellowish red |
| 162 | $H_3CO$—C$_6$H$_4$—N=N—C$_6$H$_3$(SO$_3$H)— | " | " | " | red |
| 163 | " | —N(piperidinyl) | $CH_3$ | $NH(CH_2)_3OH$ | yellowish red |
| 164 | HO—C$_6$H$_4$—N=N—C$_6$H$_3$(SO$_3$H)— | " | " | " | " |
| 165 | " | —(phenyl) | $NHC_2H_4OH$ | $NHC_2H_4OCH_3$ | red |
| 166 | $H_3CO$—C$_6$H$_4$—N=N—C$_6$H$_3$(HO$_3$S)— | " | " | " | " |
| 167 | " | —N(piperidinyl) | $CH_3$ | $NH(CH_2)_3$ | yellowish red |
| 168 | HO—C$_6$H$_4$—N=N—C$_6$H$_3$(HO$_3$S)— | " | " | " | orange |
| 169 | " | —(phenyl) | $NHC_2H_4OH$ | $NHC_2H_4OCH_3$ | red |
| 170 | $HO_3S$—C$_6$H$_4$—N=N—C$_6$H$_3$(CH$_3$)— | " | " | " | " |
| 171 | $HO_3S$—C$_6$H$_4$—N=N—naphthyl(CH$_3$)(SO$_2$H)— | " | " | $NHC_2H_4OH$ | Bordeaux |
| 172 | $HO_3S$—C$_6$H$_4$—N=N—naphthyl(CH$_3$)(SO$_3$H)— | " | " | " | " |
| 173 | (HO$_3$S)$_2$—C$_6$H$_3$—N=N—C$_6$H$_2$(CH$_3$)$_2$— | " | " | " | red |

-continued

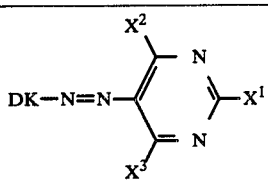

| Ex. No. | DK | $X^1$ | $X^2$ | $X^3$ | Hue of dyeing on polyamide |
|---|---|---|---|---|---|
| 174 | HO₃S—⟨Cl,Cl⟩—N=N—⟨naphthyl-SO₃H⟩— | " | " | " | violet |
| 175 | HO₃S—⟨Cl,Cl⟩—N=N—⟨CH₃,H₃C⟩— | " | " | " | red |

EXAMPLE 176

12.7 parts of 2-pyrrolidino-4-phenylamino-6-methylpyrimidine is introduced into 63 parts of oleum (23%) while cooling and the mixture is stirred for two hours at ambient temperature. The solution is then poured into ice-water. The sulfonation product having the probable formula.

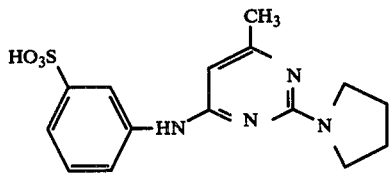

is thus precipitated. It is filtered off, washed with water and dried. The yield is 14.5 parts and the melting point of the compound is above 350° C.

3.5 parts of o-aminobenzonitrile is dissolved in 100 parts by volume of water and 10 parts by volume of concentrated hydrochloric acid. 100 parts of ice is added and diazotization is carried out in the usual way with sodium nitrite. The diazonium salt solution obtained is clarified and added at 0° to 5° C. to a solution of 11 parts of the pyrimidine (obtained by the above method) in 100 parts by volume of water, 10 parts of a 10% caustic soda solution and 200 parts of ice. The pH of the mixture is then adjusted to 6 to 7. After coupling is over the dye whose composition corresponds to the probable formula:

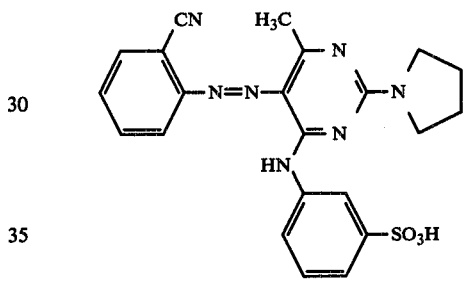

is brought into solution by adding caustic soda solution, precipitated with sodium chloride, filtered off and dried. An orange powder is obtained which colors polyamide cloth yellow hues having very good fastness properties.

EXAMPLE 177

15.8 parts of 2-p-tolyl-4,6-bis-β-methoxyethylaminopyrimidine is introduced with slight cooling into 79 parts of oleum (23%) and the mixture is stirred at 35° C. until sulfonation is completed according to a chromatogram. The mixture is then poured into ice-water, the solution is adjusted to pH 7.2 with potassium hydroxide and the potassium salt of the sulfonic acid of the formula:

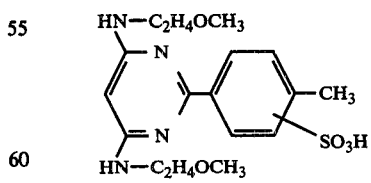

is precipitated with potassium chloride. The product is filtered off, washed with a small amount of water and dried.

12 parts of the compound thus obtained is dissolved in 100 parts by volume of water and 10 parts by volume of a 10% caustic soda solution, then 200 parts of ice is added and coupling is carried out with a solution of the diazonium salt of 3.5 parts of o-aminobenzonitrile. Coupling is over at pH 6 to 7 within a short time. The dye is brought into solution by adding caustic soda solution and the sodium salt is then precipitated with sodium chloride. After isolation in the usual way the dye which in the form of the free acid corresponds to the formula:

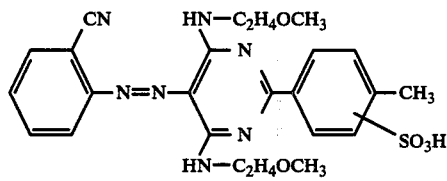

is obtained as a yellowish brown powder. It dyes polycaprolactam cloth fast yellow hues.

EXAMPLE 178

17 parts of 2-dibutylamino-4-methyl-6-phenylethylaminopyrimidine is introduced into 85 parts of oleum (23%) and heated for three hours at 60° C. The solution is then poured into ice-water. The supernatant aqueous phase is decanted off from the deposited product of the formula:

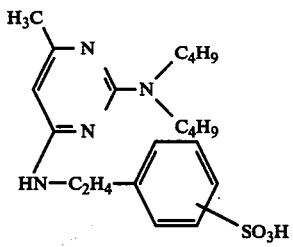

and the compound is dissolved in dilute caustic soda solution.

An aliquot portion of this mixture is coupled with the solution of the diazonium salt of 3.5 parts of o-aminobenzonitrile. The pH is brought to 6 to 7 and the reaction mixture is stirred until coupling has been completed. The precipitated dye of the formula:

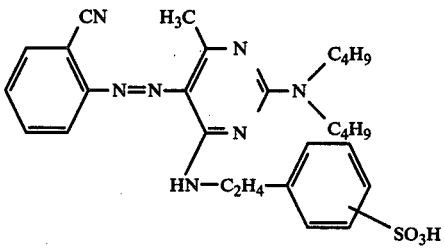

is then brought into solution with caustic soda solution and precipitated again with sodium chloride. After having been filtered off and dried an orange powder is obtained which colors polycaprolactam material yellow hues which are fast to light and wet.

EXAMPLE 179

24.8 parts of the coupling product from p-aminoazobenzene and 2-phenyl-4-β-hydroxyethylamino-6-β-methoxyethylaminopyrimidine is dissolved in 165 parts of oleum (23%) and the mixture is stirred for three hours at ambient temperature. The solution is then poured into water, the mixture is heated for ninety minutes at 75° C. and the sulfonation product is filtered off and dissolved in dilute caustic soda solution. The solution is filtered and sodium chloride is added to it.

The dye is thus precipitated. In the form of the free acid it has the formula:

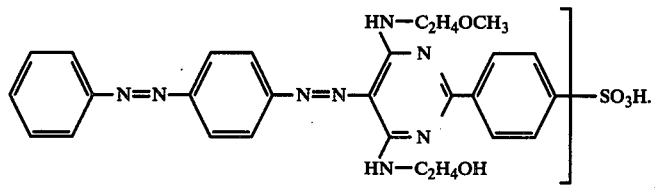

It is filtered off, washed with a small amount of water and dried. The brown powder obtained dyes polyamide cloth orange hues.

The methods described in Examples 1 to 4 and in Examples 176 to 179 may also be used for the production of the dyes set out in the following Table:

| Ex. No. | DK | $X^1$ | $X^2$ | $X^3$ | Hue |
|---|---|---|---|---|---|
| 180 | H$_5$C$_2$OOC–C$_6$H$_4$– | C$_6$H$_4$–SO$_3$H | NHC$_2$H$_5$ | NHC$_2$H$_5$ | yellow |
| 181 | 2-CH$_3$OOC–C$_6$H$_4$– | " | CH$_3$ / NHC$_2$H$_4$OH | " | " |
| 182 | (substituted biphenyl with COOCH$_3$, CH$_3$, Cl) | –N(C$_2$H$_5$)$_2$ | " | NHC$_6$H$_4$SO$_3$H / NHC$_2$H$_4$OCH$_3$ | " orange |
| 183 | | C$_6$H$_4$–SO$_3$H | | | " |
| 184 | (substituted biphenyl with COOCH$_3$, CH$_3$, Br) | " | " | " | " |
| 185 | 2,5-(H$_3$COOC)$_2$–C$_6$H$_3$–CH$_3$ | –N[CH$_2$CH(CH$_3$)$_2$]$_2$ | CH$_3$ | NHC$_2$H$_4$C$_6$H$_4$SO$_3$H | reddish yellow |
| 186 | | C$_6$H$_4$–SO$_3$H | NH$_2$ | NH$_2$ | yellow |
| 187 | phthalimide N–C$_2$H$_4$OH with CH$_3$ | " | " NHC$_2$H$_4$OH | NHC$_2$H$_4$OH | " |
| 188 | | " | | NH(CH$_2$)$_3$OCH$_3$ | " |
| 189 | " | | | NHC$_2$H$_5$ | reddish yellow |
| 190 | | | | | |

-continued

| Ex. No. | DK | $X^1$ | $X^2$ | $X^3$ | Hue |
|---|---|---|---|---|---|
| 191 | " | " | " | NH(CH$_2$)$_3$OCH$_3$ | " |
| 192 | " | " | " | NHC$_6$H$_5$ | orange |
| 193 | " | —N(C$_2$H$_5$)$_2$ | H | NHC$_2$H$_4$C$_6$H$_4$SO$_3$H | yellow |
| 194 | " | " | CH$_3$ | NHC$_2$H$_4$C$_6$H$_4$SO$_3$H | " |
| 195 | " | " | " | NHC$_2$H$_4$OCH$_3$ | " |
| 196 | (phthalimide with NC$_2$H$_4$OCH$_3$, methyl substituent) | C$_6$H$_4$(CH$_2$N(C$_2$H$_5$)(—)SO$_3$H benzyl-ethylamino sulfonic acid) | NHC$_2$H$_4$OH | NH(CH$_2$)$_3$OCH$_2$C$_6$H$_4$SO$_3$H | " |
| 197 | (phthalimide with NC$_4$H$_9$, methyl substituent) | —N(C$_2$H$_5$)$_2$ | " | NH(CH$_2$)$_3$OCH$_3$ | reddish yellow |
| 198 | " | C$_6$H$_4$(CH$_3$)SO$_3$H | " | " | " |
| 199 | (phthalimide with p-tolyl, methyl substituent) | " | " | NHC$_2$H$_4$OH | orange |
| 200 | (phthalimide with p-tolyl, methyl substituent) | " | NH(C$_2$H$_4$O)$_2$H | NH(C$_2$H$_4$O)$_2$H | " |
| 201 | " | " | NHC$_2$H$_5$ | NHC$_2$H$_5$ | " |
| 202 | (phthalimide with tolyl-SO$_3$H, methyl substituent) | —N(C$_2$H$_5$)$_2$ | NHC$_2$H$_4$OH | NHC$_6$H$_5$ | reddish yellow |
| 203 | " | " | CH$_3$ | NH(CH$_2$)$_3$OCH$_3$ | " |
| 204 | " | " | " | NHCH$_2$C$_6$H$_5$ | " |

| Ex. No. | DK | $X^1$ | $X^2$ | $X^3$ | Hue |
|---|---|---|---|---|---|
| 205 | 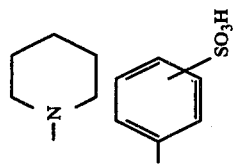 | 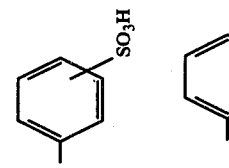 | " | $NH(CH_2)_3O(CH_2)_4OH$ | " |
| 206 | " | 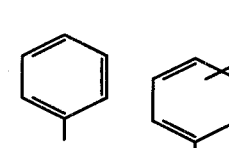 | $NHC_2H_4OH$ | $NHC_2H_4OH$ | " |
| 207 | " | 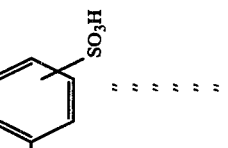 | " | $NHCH_2C_6H_4SO_3H$ | yellow |
| 208 | " | 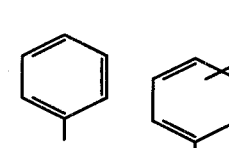 | $NH_2$ | $NH_2$ | " |
| 209 | " | " | $NH_2$ | $NH(CH_3)_2O(CH_2)_4OH$ | " |
| 210 | " | " | $NHC_2H_4OH$ | $NHC_2H_5$ | " |
| 211 | " | " | " | $NH(CH_2)_3OCH_3$ | " |
| 212 | " | " | $NH(CH_3)_3OH$ | $NHC_6H_4SO_3H$ | " |
| 213 | " | " | $NHC_2H_4OH$ | $NHC_6H_5$ | " |
| 214 | " | " | " | $NH(CH_2)_3OC_2H_4C_6H_5$ | " |
| 215 | " | " | $NHC_2H_4OCOCH_3$ | $NH(CH_2)_3OC_2H_4OCH_3$ | " |
| 216 | " | " | $NHC_2H_4OH$ | " | " |
| 217 | " | " | | 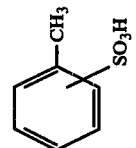 | " |
| 218 | " | " | | | " |
| 219 | " | " | $NHC_2H_5$ | $NHC_6H_3(OCH_3)SO_3H$ | " |
| 220 | " | | $NH(CH_3)_3OH$ | $NH(CH_2)_3OC_3H_7(i)$ | " |
| 221 | " | | | | " |

-continued

| Ex. No. | DK | $X^1$ | $X^2$ | $X^3$ | Hue |
|---|---|---|---|---|---|
| 222 | " | 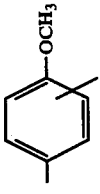 | " | $NH(CH_2)_3OCH_3$ | " |
| 223 | " | 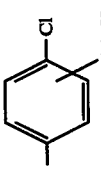 | $NH(C_2H_4O)_2H$ | $NH(C_2H_4O)_2H$ | " |
| 224 | " | $-CH_3$ | $NHC_6H_4SO_3H$ | $NHC_2H_4OCH_3$ | " |
| 225 | " | $-CH(CH_3)_2$ | $NHC_2H_4C_6H_4SO_3H$ | " | " |
| 226 | " | | $NH(CH_2)_3OH$ | $NH(CH_2)_3OH$ | " |
| 227 | " | 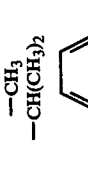 | H | $NHC_6H_4SO_3H$ | " |
| 228 | " | $-N(C_2H_5)_2$ | $CH_3$ | $NHC_2H_4C_6H_4SO_3H$ | " |
| 229 | " | " | " | $NHCH_2C_6H_4SO_3H$ | " |
| 230 | 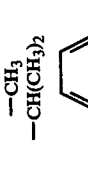 | 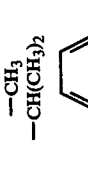 | " | " | " |
| 231 | " | $-N(C_2H_5)_2$ | " | $NHC_2H_4C_6H_4SO_3H$ | " |
| 232 | " | 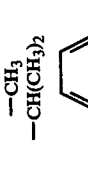 | $NHC_2H_4OH$ | $NH(CH_2)_3OCH_3$ | " |
| 233 | " | " | $NH(CH_2)_3OH$ | $NHC_6H_5$ | " |
| 234 | " | " | $NHC_2H_4OH$ | $NHC_6H_4SO_3H$ | " |
| 235 | " | " | $NHC_2H_4OCOCH_3$ | $NHC_2H_4OH$ | " |
| 236 | " | " | $NHC_2H_4OCO\overset{H}{|}$ | $NHC_2H_4OCOCH_3$ | " |
| 237 | " | " | | $NHC_2H_4OCO\overset{H}{|}$ | " |
| 238 | " | " | $NHC_2H_4OCOCH_2COCH_3$ | $NHC_2H_4OCOCH_2COCH_3$ | " |

-continued

| Ex. No. | DK | $X^1$ | $X^2$ | $X^3$ | Hue |
|---|---|---|---|---|---|
| 239 | 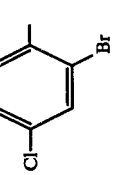 | " | $NHC_2H_4OH$ | $NHC_2H_4OH$ | orange |
| 240 | 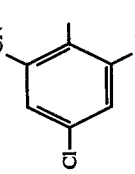 | 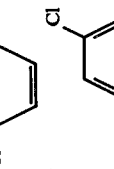 ($SO_3H$) | " | $NHC_6H_4SO_3H$ | " |
| 241 | 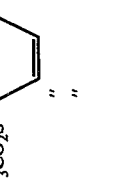 | " | " | " | yellow |
| 242 |  | 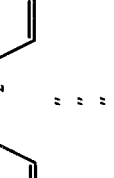 ($SO_3H$) | $NHC_2H_5$ | $NHC_2H_5$ | orange |
| 243 | " | piperidine-N-CH₃ | $NH(C_2H_4O)_2H$ | $NHCH_2C_6H_4OCH_3$ | " |
| 244 | " | | $CH_3$ | $NHCH_2C_6H_4SO_3H$ | " |
| 245 | " | 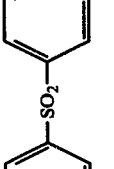 ($SO_3H$) | $NHC_2H_4OH$ | $NHC_2H_4OH$ | reddish yellow |
| 246 | <diphenylsulfone structure> | " | $NHC_2H_4OH$ | $NHCH_2C_6H_4SO_3H$ | " |
| 247 | " | " | $CH_3$ | $NHCH_2C_6H_4SO_3H$ | yellow |
| 248 | " | $-N(C_2H_5)_2$ $-CH_3$ | $NHCH_2C_6H_4SO_3H$ | $NHC_2H_4OCH_3$ | " |
| 249 | <diphenylsulfone structure> | ($SO_3H$) phenyl | $NHC_2H_4OH$ | $NHC_2H_4OH$ | reddish yellow |

-continued

| Ex. No. | DK | $X^1$ | $X^2$ | $X^3$ | Hue |
|---|---|---|---|---|---|
| 250 | 4-methyl-phenyl-NH-CO-NH-(2-SO$_3$H-phenyl) | " | NHC$_2$H$_5$ | NHC$_2$H$_5$ | yellow |
| 251 | H$_3$C-OC-NH-(4-methylphenyl) | phenyl | NHC$_2$H$_4$OH | NHC$_2$H$_4$OH | " |
| 252 | " | 3-SO$_3$H-phenyl with -N(C$_2$H$_5$)$_2$ and -CH$_3$ | NHC$_2$H$_4$OH | NH(CH$_2$)$_3$OCH$_2$C$_6$H$_4$SO$_3$H | " |
| 253 254 255 | H$_3$C-OC-HN-(3-methylphenyl) | 3-SO$_3$H-phenyl | CH$_3$ NHC$_2$H$_4$OCH$_3$ NHC$_2$H$_4$OH | NHC$_2$H$_4$C$_6$H$_4$SO$_3$H " NH(CH$_2$)$_3$OCH$_2$C$_6$H$_4$SO$_3$H | " " " |
| 256 | O$_2$N-(4-methylphenyl) | " | " | NHC$_2$H$_4$OCH$_3$ | orange |
| 257 | H$_2$N-OC-(4-methylphenyl) | " | " | " | yellow |
| 258 259 | H$_9$C$_4$-HC(C$_2$H$_5$)-H$_2$C-N(H)-OC-(4-methylphenyl) | -N(C$_2$H$_5$)$_2$ 3-SO$_3$H-phenyl | CH$_3$ NHC$_2$H$_4$OH | NHC$_2$H$_4$C$_6$H$_4$SO$_3$H NHC$_2$H$_4$OH | " " |
| 260 261 | (H$_5$C$_2$)$_2$N-OC-(4-methylphenyl) | " " | " " | NHCH$_2$C$_6$H$_4$SO$_3$H NHC$_2$H$_4$OH | " " |

-continued

| Ex. No. | DK | $X^1$ | $X^2$ | $X^3$ | Hue |
|---|---|---|---|---|---|
| 262 | $H_9C_4$—HN—OC-(3-methylphenyl) | " | | | " |
| 263 | $H_3C$—HN—$O_2S$-(4-methylphenyl) | " | | | " |
| 264 | " | " | $CH_3$ | $NHCH_2C_6H_4SO_3H$ | " |
| 265 | $H_9C_4$—HN—$O_2S$-(4-methylphenyl) | N-methylpiperidine | $NHC_2H_4OH$ | $NHC_2H_4OH$ | " |
| 266 | " | 3-methylbenzenesulfonic acid | $NHC_2H_4OCOCH_3$ | $NHC_2H_4OCOCH_3$ | " |
| 267 | " | " | $NHC_2H_4OH$ | $NH(CH_2)_3OC_2H_4OC_6H_5$ | " |
| 268 | " | " | $NH(CH_2)_3OH$ | $NHC_6H_4SO_3H$ | orange |
| 269 | " | " | $NH_2$ | $NHC_2H_4OH$ | orange |
| 270 | (4-methylphenyl)-N=N-phenyl | " | $NHC_2H_4OH$ | $NH(CH_2)_3OCH_3$ | reddish orange |
| 271 | " | " | " | $NH(CH_2)_3OCH_2C_6H_4SO_3H$ | " |
| 272 | " | " | " | $NHC_2H_5$ | " |
| 273 | " | " | " | $NH$-phenyl | " |
| 274 | " | " | " | $NH$-norbornyl | " |
| 275 | " | " | $NHCH_2CHCH_3$—OH | $NHCH_2CHCH_3$—OH | " |
| 276 | " | " | $NH(CH_2)_4OH$ | $NHC_2H_4OCH_3$ | " |
| 277 | " | " | $NH(CH_2)_6OH$ | " | " |
| 278 | " | " | $NH(CH_2)_3O(CH_2)_4OH$ | " | " |

-continued

| Ex. No. | DK | $X^1$ | $X^2$ | $X^3$ | Hue |
|---|---|---|---|---|---|
| 279 | " | " | $NHC_2H_4OH$ | 4-HO-C6H4-NHCH(CH3)2 | " |
| 280 | " | " | " | $NHCH_2CHC_6H_5$ / $CH_3$ (—CH(CH3)—) | " |
| 281 | " | " | " | $NHC_2H_4OCH_3$ | " |
| 282 | " | 2-CH3, 1-SO3H phenyl | $NHC_2H_4OCH_3$ | $NHC_2H_4C_6H_4SO_3H$ | orange |
| 283 | " | —CH3 | $NHC_2H_4C_6H_4SO_3H$ | " | " |
| 284 | " | —CH3 | " | " | " |
| 285 | " | —CH(CH3)CH3 | $NHC_2H_4OCH_3$ | $NHC_2H_4OCH_3$ | " |
| 286 | " | —CH2C6H4SO3H | $NHCH_2C_6H_4SO_3H$ | $NH(CH_2)_3OCH_3$ | " |
| 287 | " | " | H | $NHC_2H_4C_6H_4SO_3H$ | " |
| 288 | " | —N(C2H5)2 | $CH_3$ | " | " |
| 289 | " | " | " | $NHC_6H_4SO_3H$ | " |
| 290 | " | pyrrolidinyl | $NHC_2H_4OH$ | $NHC_2H_4OH$ | yellowish red |
| 291 | " | 3-SO3H phenyl | $CH_3$ | $NHC_2H_4C_6H_4SO_3H$ | orange |
| 292 | " | —N(C2H5)2 | $NHC_2H_4OH$ | $NHCH_2C_6H_4SO_3H$ | yellowish red |
| 293 | " | 3-SO3H phenyl | " | " | " |

DK structures (bottom of table):
- Ex. 290: 2-CH3 / 3'-CH3 azo-bis(tolyl) (4-(2-methylphenylazo)-3-methylphenyl)
- Ex. 291, 292: 3,3'-dimethyl-4-aminoazobenzene type (H3C-C6H3-N=N-C6H3-CH3)
- Ex. 293: 2-CH3, 3'-CH3, 4'-Cl diazo component -continued

| Ex. No. | DK | $X^1$ | $X^2$ | $X^3$ | Hue |
|---|---|---|---|---|---|
| 294 | 3-Cl-4-CH₃-6-HO₃S-C₆H₂-SO₂-C₆H₃(2-CH₃)(4-Cl) | " | " | NHCH₂C₆H₅ | yellow |
| 295 | 2-CH₃-4-HO₃S-C₆H₂-SO₂-C₆H₃(3-Cl)(4-Cl) | " | " | " | " |
| 296 | " | " | " | " | " |
| 297 | " | " | " | " | " |
| 298 | " | N-methylpiperidinyl | CH₃ | cyclohexyl-NH | " |
| 299 | " | 3-SO₃H-phenyl (with CH₃) | NHC₃H₇ | NHCH₂C₆H₄SO₃H | " |
| 300 | 2,5-Cl₂-4-CH₃-C₆H₂-SO₃H | " | NHC₂H₄OH | NHC₃H₇ | " |
| 301 | " | 2-CH₃-4-CH₃-phenyl-SO₃H | NH(CH₂)₃OH | NHC₄H₉ / NH(CH₂)₃OC₃H₇(i) | " |
| 302 | " | " | " | NHC₂H₄C₆H₄SO₃H | " |

-continued

| Ex. No. | DK | X¹ | X² | X³ | Hue |
|---|---|---|---|---|---|
| 303 | " | -CH₂-C₆H₃(SO₃H) (from 2,5-dichlorotoluene sulfonamide structure) | " | NH(CH₂)₃OH | " |
| 304 | " | N-methylpiperidinyl-C₆H₄-SO₃H | CH₃ | NHCH₂C₆H₄SO₃H | " |
| 305 | " | -C₆H₃(SO₃H)(CH₃) (benzothiazole structure) | NHC₂H₄OH | NHC₄H₉ | " |
| 306 | " | N-methylpiperidinyl-C₆H₄-SO₃H | CH₃ | NHCH₂C₆H₄SO₃H | " |
| 307 | " | " | NHC₂H₄OH | NHC₄H₉ | orange |
| 308 | " | " | " | NHC₂H₄C₆H₅ | reddish orange |
| 309 310 311 | " | —N(C₄H₉)₂-C₆H₄-SO₃H | NH(CH₂)₃OCH₃<br>CH₃<br>NHC₂H₄OH | NH(CH₂)₃OCH₃<br>NHC₂H₄C₆H₄SO₃H<br>NH(CH₂)₃OCH₂C₆H₄SO₃H | " orange |
| 312 | " | C₆H₅ (from azo structure) | " | " | " |

-continued
| Ex. No. | DK | $X^1$ | $X^2$ | $X^3$ | Hue |
|---|---|---|---|---|---|
| 313 | 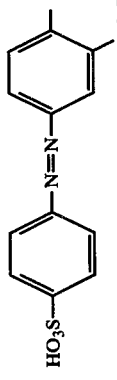 | 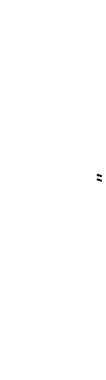 | " | $NHC_6H_{13}$ | red |
| 314 | " | " | " | 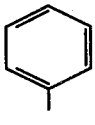 | " |
| 315 | " |  | " | $NHC_2H_4C_6H_4SO_3H$ | " |
| 316 | " | $-(CH_2CH\overset{CH_3}{\underset{}{)}}CH_2CH_3)_2$ | $CH_3$ | " | reddish orange |
| 317 | " | $-N(CH_2CHC_4H_9)_2$ with $C_2H_5$ | $CH_3$ | " | " |
| 318 | " |  | $NH(CH_2)_3OCH_3$ | $NH(CH_2)_3OCH_3$ | yellowish red |
| 319 320 | 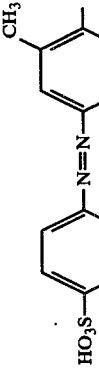 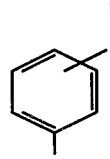 | " " | $NHC_2H_4OH$ | $NHC_2H_4OCH_3$ $NHC_2H_4OH$ | " red |

EXAMPLE 321

14.9 parts of the coupling product from 4-aminoazobenzene and 2-phenyl-4-β-hydroxyethylamino-6-β-methoxyethylaminopyrimidine is introduced while cooling into 200 parts of 96% sulfuric acid. The mixture is stirred for several hours at room temperature and then the solution is poured into an amount of ice-water enough to prevent the temperature rising above 10° C. The precipitated dye of the probable formula:

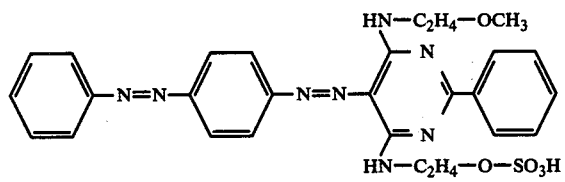

is filtered off, washed with water, dissolved in dilute caustic soda solution, filtered and precipitated as the sodium salt with sodium chloride. Conventional processing gives a reddish brown powder which colors synthetic polyamide material fast yellowish red hues.

EXAMPLE 322

A solution of 13.4 parts of the coupling product from 4-amino-2-methyl-5-methoxy-4'-β-hydroxyethoxyazobenzene and 2-phenyl-4,6-bis-γ-ethoxypropylaminopyrimidine in 150 parts of 96% sulfuric acid is stirred for twenty-four hours at room temperature. Then the mixture is added to so much ice that the temperature does not rise above 10° C. The dye of the formula:

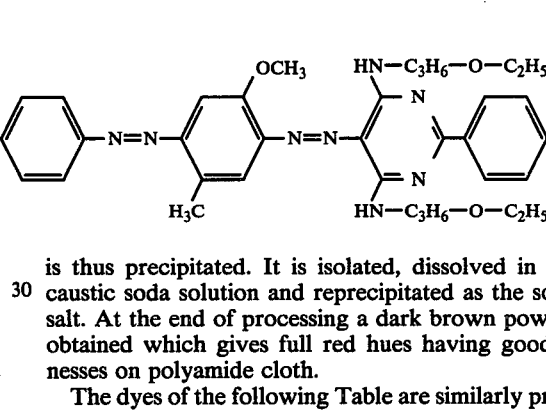

is thus precipitated. It is isolated, dissolved in dilute caustic soda solution and reprecipitated as the sodium salt. At the end of processing a dark brown powder is obtained which gives full red hues having good fastnesses on polyamide cloth.

The dyes of the following Table are similarly prepare according to the methods expressly described in Example 1 to 4, 176 to 179 and 321 to 322:

| Ex. No. | DK | X¹ | X² | X³ | Hue |
|---|---|---|---|---|---|
| 323 | (methyl 3,5-dichloro-2-methylbenzoate structure) | phenyl-SO₃H | NH(CH₂)₅COOH | NHC₂H₄OCH₃ | orange |
| 324 | (methyl 3,5-dibromo-2-methylbenzoate structure) | " | " | " | " |
| 325 | (phthalimide with NC₂H₄OSO₃H, methyl) | " | NHC₂H₄OCCC₂H₄COOH | " | " |
| 326 | " | " | NHC₂H₄OH | NHC₂H₄C₆H₅ | reddish yellow |
| 327 | " | phenyl | NH₂ | NHC₂H₄OH | yellow |
| 328 | " | " | NHC₂H₅ | " | reddish yellow |
| 329 | " | (benzyl-N(C₂H₅)-phenyl-SO₃H) | CH₃ | NHC₂H₄OCH₃ | yellow |
| 330 | (phthalimide with NC₄H₉, methyl) | phenyl-SO₃H | NHC₂H₄OSO₃H | NH(CH₂)OCH₃ | reddish yellow |

-continued

| Ex. No. | DK | X¹ | X² | X³ | Hue |
|---|---|---|---|---|---|
| 331 | 3-methyl-2-(N-butylcarbamoyl)benzoyl | 4-methylphenyl-SO₃H | NH(CH₂)₅COOH | NHC₂H₄OCH₃ | reddish yellow |
| 332 | 3-methyl-2-[N-(4-methyl-3-sulfophenyl)carbamoyl]benzoyl | piperidinyl (N-) | CH₃ | NH(CH₂)₃O(CH₂)₄OSO₃H | orange |
| 333 | 2-cyano-3-methylphenyl | phenyl | NHC₂H₄OSO₃H | NHCH₂C₆H₄SO₃H | yellow |
| 334 | " | 4-methylphenyl-SO₃H | NHC₂H₄SO₃H | NH(CH₂)₃OCH₃ | " |
| 335 | " | " | NHC₂H₄OH | NHC₆H₄SO₃H | " |
| 336 | " | " | NHC₂H₄OSO₃H | NHC₆H₅ | " |
| 337 | " | " | " | NH-norbornyl | " |
| 338 | " | 4-chlorophenyl | NH(C₂H₄O)₂SO₃H | NH(C₂H₄O)₂SO₃H | " |
| 339 | 2-cyano-methyl-5-chlorophenyl | 4-methylphenyl-SO₃H | NHC₂H₄OCOCH₃ | NH(CH₂)₃OCH₃ | " |

-continued

| Ex. No. | DK | $X^1$ | $X^2$ | $X^3$ | Hue |
|---|---|---|---|---|---|
| 340 | 2-methyl-3-bromo-5-chloro-6-cyano-phenyl (with CN, Cl, Br, CH₃ substituents) | 4-methylphenyl-SO₃H | $NHC_2H_4OSO_3H$ | $NH(CH_2)_3OCH_3$ | orange |
| 341 | " | phenyl | $NHC_2H_4SO_3H$ | " | " |
| 342 | " | " | $NHC_2H_4OSO_3H$ | $NHC_2H_4OSO_3H$ | " |
| 343 | 3-chloro-4-methyl-5-(methylsulfonyl)phenyl | $-N(C_2H_5)_2$ | $CH_3$, $NHC_2H_4OSO_3H$ | $NH(CH_2)_3OC_2H_4OC_6H_4SO_3H$, $NHC_2H_4OSO_3H$ | yellow |
| 344 | " | " | | | " |
| 345 | $H_9C_4$—HC($C_2H_5$)—$H_2C$—HN—OC—(4-substituted phenyl)—N=N—phenyl | " | $NHSO_3H$ | $NHC_2H_4OCH_3$ | orange |
| 346 | " | 4-methylphenyl-SO₃H | $NHC_2H_4SO_3H$ | $NH(CH_2)_3OCH_3$ | reddish orange |
| 347 | " | " | $NHC_2H_4OSO_3H$ | cyclohexyl-NH | " |
| 348 | " | " | " | norbornyl-NH | " |
| 349 | 2,3-dimethylphenyl—N=N—2-methylphenyl | $-N(C_2H_5)_2$ | $NH(CH_2)_6OSO_3H$ | $NHC_2H_4OCH_3$ | " |
| 350 | " | " | $CH_3$ | $NHC_2H_4SO_3H$ | " |
| 351 | " | " | $NHC_2H_4OSO_3H$ | $NHC_2H_4OSO_3H$ | yellowish red |

-continued

| Ex. No. | DK | X$^1$ | X$^2$ | X$^3$ | Hue |
|---|---|---|---|---|---|
| 352 | 2,5-dichloro-4-methyl benzenesulfonic acid | | | NHC$_4$H$_9$ | yellow |
| 353 | " | " | NH(CH$_2$)$_3$OSO$_3$H | NH(CH$_2$)$_3$OSO$_3$H | " |
| 354 | HO$_3$S—H$_4$C$_2$—HN—O$_2$S—(2,5-dichloro-4-methylphenyl) | —CH$_2$—C$_6$H$_5$ | NHC$_2$H$_4$OSO$_3$H | NHC$_4$H$_9$ | " |
| 355 | 2-(p-tolyl)-6-methyl-7-sulfo-benzothiazole | C$_6$H$_5$ | " | " | orange |
| 356 | 4-methylphenyl-azo-4-sulfophenyl | " | " | " | " |
| 357 | 2,5-dimethyl-4-chloro-phenyl-azo-4-sulfo-2-chloro-phenyl | " | NHC$_2$H$_4$SO$_3$H | NH(CH$_2$)$_3$OCH$_2$C$_6$H$_5$ | red |
| 358 | 2,5-dimethylphenyl-azo-3,5-disulfophenyl | " | NHC$_2$H$_4$OCH$_3$ | NH(CH$_2$)$_3$OCH$_3$ | " |
| | | | | NHC$_2$H$_4$OCH$_3$ | " |

-continued

| Ex. No. | DK | X$^1$ | X$^2$ | X$^3$ | Hue |
|---|---|---|---|---|---|
| 359 | HO$_3$S—⟨benzene⟩—N=N—⟨benzene with CH$_3$⟩— | —⟨benzene⟩— | NH(CH$_2$)$_3$OH | NH(CH$_2$)$_3$OH | yellowish red |
| 360 | " | —⟨benzene-SO$_3$H⟩— | " | " | " |
| 361 | " | —CH(CH$_3$)$_2$ (isopropyl, —CH with two CH$_3$) | NHC$_2$H$_4$OH | NHC$_2$H$_4$OH | reddish orange |
| 362 | HO$_3$S—⟨naphthalene, Cl, Cl, SO$_3$H⟩—N=N—⟨naphthalene-SO$_3$H⟩— | —⟨benzene-SO$_3$H⟩— | NH(CH$_2$)$_3$OCH$_3$ | NH(CH$_2$)$_3$OCH$_3$ | violet |
| 363 | HO$_3$S—⟨benzene⟩—N=N—⟨benzene-SO$_3$H⟩—N=N—⟨benzene with 2 CH$_3$⟩— | —⟨benzene⟩— | NHC$_2$H$_4$OH | NHC$_2$H$_4$OH | red |
| 364 | ⟨phthalimide with N—C$_2$H$_4$—OH⟩— | —⟨benzene-SO$_3$H⟩— | NH—C$_2$H$_5$ | NHC$_2$H$_5$ | yellow |

-continued

| Ex. No. | DK | $X^1$ | $X^2$ | $X^3$ | Hue |
|---|---|---|---|---|---|
| 365 | 4-Cl-3-methyl-benzenesulfonic acid | —N(C₂H₅)₂ | CH₃ | NH(C₂H₄O)₂H | " |
| 366 | 4-Cl-3-methyl-benzenesulfonic acid | —N(CH₃)₂ | CH₃ | NHC₂H₄C₆H₅ | " |
| 367 | 4-Cl-3-methyl-benzenesulfonic acid | —N(C₄H₉)₂ | CH₃ | NHC₂H₄C₆H₄SO₃H | " |
| 368 | 4-Cl-3-methyl-benzenesulfonic acid | piperidinyl | CH₃ | NHC₃H₆OH | " |
| 369 | 2,5-dichloro-4-methyl-benzenesulfonic acid | 4-methylbenzenesulfonic acid | NHC₃H₆OCH₃ | NHC₃H₆OCH₃ | " |
| 370 | 2,5-dichloro-4-methyl-benzenesulfonic acid | phenyl | NH(C₂H₄O)₂H | NH(C₂H₄O)₂H | " |

-continued

| Ex. No. | DK | $X^1$ | $X^2$ | $X^3$ | Hue |
|---|---|---|---|---|---|
| 371 | HO₃S—⟨Cl,Cl-phenyl⟩ | —N(C₄H₉)₂ | CH₃ | NHC₂H₄C₆H₄SO₃H | " |
| 372 | HO₃S—C₆H₄—N=N—C₆H₄(CH₃)— | phenyl | NH₂ | NHC₃H₆OCH₃ | yellowish red |
| 373 | HO₃S—C₆H₄—N=N—C₆H₄(CH₃)— | phenyl | NH(C₂H₄O)₂H | NH(C₂H₄O)₂H | " |
| 374 | HO₃S—C₆H₄—N=N—C₆H₃(SO₃H)(CH₃)— | phenyl | NH₂ | NHC₃H₆OCH₃ | " |
| 375 | HO₃S—C₆H₄—N=N—C₆H₃(SO₃H)(CH₃)— | —N(C₂H₅)₂ | CH₃ | NHC₂H₄C₆H₅ | " |
| 376 | HO₃S—C₆H₄—N=N—C₆H₃(SO₃H)(CH₃)— | —N(C₃H₇)₂ | CH₃ | NHC₆H₅ | " |
| 377 | HO₃S—C₆H₄—N=N—C₆H₃(CH₃)— | phenyl | NHC₂H₄OCH₃ | NHC₂H₄OCH₃ | " |

-continued

| Ex. No. | DK | $X^1$ | $X^2$ | $X^3$ | Hue |
|---|---|---|---|---|---|
| 378 | (structure) | phenyl | $NH(C_2H_4O)_2H$ | $NHC_2H_4C_6H_4SO_3H$ | red |
| 379 | (structure) | phenyl | $NHC_2H_5$ | $NHC_2H_5$ | " |
| 380 | (structure) | phenyl | $NHC_3H_6OH$ | $NHC_3H_6OH$ | " |
| 381 | (structure) | phenyl | $NH(C_2H_4O)_2H$ | $NH(C_2H_4O)_2H$ | " |
| 382 | (structure) | phenyl | $NHC_2H_4OCH_3$ | $NHC_2H_4OCH_3$ | " |
| 383 | (structure) | phenyl | $NHC_3H_6OCH_3$ | $NHC_3H_6OCH_3$ | " |

| Ex. No. | DK | X¹ | X² | X³ | Hue |
|---|---|---|---|---|---|
| 384 | (2-SO₃H, 4-HO₃S phenyl)-N=N-(2,5-dimethylphenyl) | phenyl | NHC₂H₅ | NHC₂H₅ | " |
| 385 | (2-SO₃H, 4-HO₃S phenyl)-N=N-(2,5-dimethylphenyl) | phenyl | NHC₃H₆OH | NHC₃H₆OH | " |
| 386 | (2-SO₃H, 4-HO₃S phenyl)-N=N-(2,5-dimethylphenyl) | phenyl | NH(C₂H₄O)₂H | NH(C₂H₄O)₂H | " |
| 387 | (2,5-Cl₂, 4-HO₃S phenyl) | phenyl | NHC₆H₅ | NHC₂H₄OH | orange |
| 388 | (2,5-Cl₂, 4-HO₃S phenyl) | N(C₂H₅)₂ | CH₃ | NHCH₂CH(CH₃)—C₆H₄SO₃H | yellow |
| 389 | (2,5-Cl₂, 4-HO₃S phenyl) | piperidino | CH₃ | NH(CH₂)₃O(CH₂)₂OC₆H₄SO₃H | " |

-continued

| Ex. No. | DK | X¹ | X² | X³ | Hue |
|---|---|---|---|---|---|
| 390 | (structure: benzene with SO₃H, Cl, HO₃S) | (phenyl) | NHC₂H₅ | NHC₂H₅ | " |
| 391 | (structure: benzene with CN, CH₃) | N(CH₃)₂ | CH₃ | NHCH₂CHC₆H₄SO₃H<br>           \|<br>           CH₃ | " |
| 392 | " | " | " | NHCH₂C₆H₄SO₃H | " |
| 393 | " | " | " | NH(CH₂)₃OCH₂C₆H₄SO₃H | " |
| 394 | (structure: benzene with COOCH₃, CH₃) | N(CH₃)₂ | CH₃ | NHCH₂CHC₆H₄SO₃H<br>           \|<br>           CH₃ | " |
| 395 | (structure: benzene with SO₂-phenyl, CH₃) | (phenyl) | NHCH₂C₆H₄SO₃H | NHCH₂C₆H₄SO₃H | " |
| 396 | " | " | NHC₂H₄C₆H₄SO₃H | NHC₂H₄C₆H₄SO₃H | " |
| 397 | (structure: benzene with CN, CH₃) | " | " | " | " |
| 398 | (structure: azo compound) | " | " | " | yellowish red |
| 399 | (structure: bis-azo with HO₃S) | " | " | " | " |

-continued

| Ex. No. | DK | X¹ | X² | X³ | Hue |
|---|---|---|---|---|---|
| 400 | HO₃S-C₆H₄-N=N-(2,5-diCH₃-C₆H₃)- | " | " | " | red |
| 401 | " | " | NHCH₂C₆H₄SO₃H | NHCH₂C₆H₄SO₃H | " |
| 402 | " | " | " | " | " |
| 403 | (3-Cl-4-CH₃-C₆H₃)-N=N-C₆H₅ | " | NH(C₂H₄O)₂H | NHC₂H₄C₆H₄SO₃H | " |
| 404 | " | " | NHC₂H₄C₆H₄SO₃H | NH(CH₂)₃OCH₂C₆H₄SO₃H | " |
| 405 | " | " | NH(CH₂)₃OCH₂C₆H₄SO₃H | NH(CH₂)₃O(CH₂)₂OC₆H₄SO₃H | " |
| 406 | " | " | NH(CH₂)₃O(CH₂)₂OC₆H₄SO₃H | " | " |

We claim:
1. A dye of the formula:

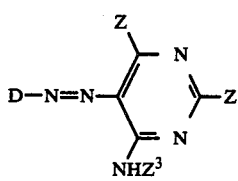

in which

D is selected from the group consisting of
(1) phenyl substituted by chloro; bromo; methyl; ethyl; trifluoromethyl; cyano; methylsulfonyl; ethylsulfonyl; phenylsulfonyl; $C_1$- to $C_4$-alkoxycarbonyl; carbamoyl; sulfamoyl; sulfamoyl substituted at the nitrogen once or twice by $C_1$- to $C_2$-alkyl, $\beta$-hydroxyethyl, $\gamma$-hydroxypropyl, $\beta$-methoxyethyl or $\gamma$-methoxypropyl; hydroxysulfonyl; $SO_2NHC_2H_4SO_3H$; or 6-methyl-7-sulfo-2-benzthiazolyl;
(2) phenylazophenyl;
(3) phenylazophenyl substituted by hydroxy, methyl, methoxy, ethoxy, hydroxysulfonyl or —$OC_2H_4$—O—$SO_3H$;
(4) 3- or 4-phthalimidyl; and
(5) 3- or 4-phthalimidyl substituted at the nitrogen by $C_1$- to $C_4$-alkyl, $\beta$-hydroxyethyl, $\beta$-methoxyethyl, $\gamma$-hydroxypropyl, $\beta$-hydroxyethoxyethyl, benzyl, phenylethyl, sulfobenzyl, sulfophenylethyl, phenyl or phenyl substituted by methyl or hydroxysulfonyl;
one Z is

and the other Z is hydrogen; $C_1$- to $C_3$-alkyl; cyclohexyl; benzyl; sulfobenzyl; phenylethyl; sulfophenylethyl; phenyl; or phenyl substituted by methyl, chloro, methoxy, ethoxy or hydroxysulfonyl; $Z^1$ is hydrogen; $C_1$- to $C_8$-alkyl; $C_2$- to $C_6$-alkyl substituted by hydroxy, methoxy, ethoxy or cyano; cyclohexyl; norbornyl; benzyl; sulfobenzyl; phenylethyl; sulfophenylethyl; phenylpropyl; sulfophenylpropyl; phenyl; phenyl substituted by methyl, methoxy, ethoxy, chloro or hydroxysulfonyl; sulfoethyl; $(CH_2)_3OC_6H_5$; $(CH_2)_3OC_6H_4SO_3H$; $(CH_2)_3OCH_2C_6H_5$; $(CH_2)_3OCH_2C_6H_4SO_3H$; $C_2H_4OC_2H_4OH$; $(CH_2)_3OC_2H_4OZ^5$; or $(CH_2)_3O(CH_2)_4OH$;
$Z^3$ has the meanings given for $Z^1$;
$Z^2$ is hydrogen or $C_1$- to $C_4$-alkyl;
$Z^1$ and $Z^2$ together with the nitrogen are pyrrolidino, piperidino or morpholino; and
$Z^5$ is $C_1$- to $C_4$-alkyl, benzyl, sulfobenzyl, phenyl or sulfophenyl, with the proviso that the dye contains a total of 1, 2 or 3 sulfonic acid groups.
2. A dye according to claim 1 having the formula

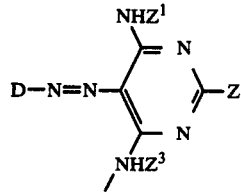

in which
Z is hydrogen; $C_1$- to $C_3$-alkyl; cyclohexyl; benzyl; sulfobenzyl; phenylethyl; sulfophenylethyl, phenyl; or phenyl substituted by methyl, chloro, methoxy, ethoxy or hydroxysulfonyl; and D, $Z^1$ and $Z^3$ have the meanings given for claim 1.
3. A dye according to claim 1 having the formula

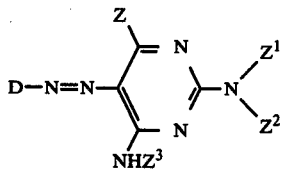

in which
Z is hydrogen; $C_1$- to $C_3$-alkyl; cyclohexyl; benzyl; sulfobenzyl; phenylethyl; sulfophenylethyl; phenyl; or phenyl substituted by methyl, chloro, methoxy, ethoxy or hydroxysulfonyl; and D, $Z^1$, $Z^2$ and $Z^3$ have the meanings given for claim 1.
4. A dye according to claim 1 having the formula

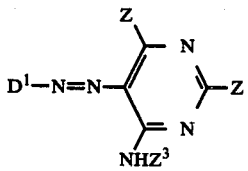

in which $D^1$ is a radical of the formula:

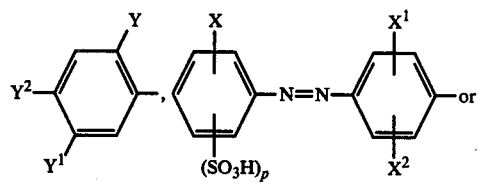

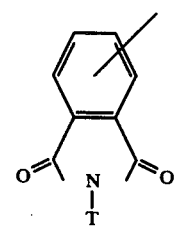

p is zero or 1;
Y is hydrogen, cyano, chloro, bromo, methylsulfonyl, ethylsulfonyl, phenylsulfonyl, methoxycarbonyl, ethoxycarbonyl or $SO_3H$;
$Y^1$ is hydrogen, chloro, bromo or $SO_3H$;

$Y^2$ is hydrogen, chloro, bromo, methyl, methylsulfonyl, methoxycarbonyl, ethoxycarbonyl, 6-methyl-7-sulfo-2-benzothiazolyl or $SO_3H$;

X is hydrogen, methyl, hydroxy, methoxy, ethoxy or $SO_3H$;

$X^1$ is hydrogen, methyl or $SO_3H$;

$X^2$ is hydrogen or methyl;

T is hydrogen, β-hydroxyethyl, γ-hydroxypropyl, β-methoxyethyl, benzyl, phenyl or methylphenyl; and Z and $Z^3$ have the meanings given for claim 1.

5. A dye according to the formula in claim 2 in which Z is methyl, ethyl, propyl, benzyl, sulfobenzyl, phenyl or phenyl bearing methyl or methoxy, $Z^1$ is $C_1$ to $C_4$-alkyl; $C_2$- or $C_3$-alkyl bearing hydroxy, methoxy or ethoxy as substituent; benzyl; sulfobenzyl; phenylethyl; sulfophenylethyl; phenylpropyl; sulfophenylpropyl; phenyl; phenyl bearing methyl, methoxy or hydroxysulfonyl as substituent; sulfoethyl; $CH_2CH_2OCH_2-CH_2OH$; $(CH_2)_3O(CH_2)_4OH$; $(CH_2)_3OCH_2C_6H_5$; $(CH_2)_3OCH_2C_6H_4SO_3H$; $(CH_2)_3O(CH_2)_2OC_6H_5$; or $(CH_2)_3O(CH_2)_2OC_6H_4SO_3H$;

$Z^3$ is hydrogen or $Z^1$; and

D has the meanings given for claim 2.

6. A dye according to the formula in claim 3 in which Z is methyl, ethyl, propyl or phenyl;

$Z^1$ is $C_1$- to $C_4$-alkyl, cyclohexyl, benzyl, sulfobenzyl, phenylethyl or sulfophenylethyl;

$Z^2$ is hydrogen or $C_1$- to $C_4$-alkyl;

$Z^1$ and $Z^2$ together with the nitrogen are pyrrolidino, piperidino or morpholino;

$Z^3$ is $C_1$ to $C_4$-alkyl; $C_2$- or $C_3$-alkyl bearing hydroxy, methoxy or ethoxy as substituent; benzyl; sulfobenzyl; phenylethyl; sulfophenylethyl; phenylpropyl; sulfophenylpropyl; phenyl; phenyl bearing methyl, methoxy or hydroxysulfonyl as substituent; sulfoethyl; $CH_2CH_2OCH_2CH_2OH$, $(CH_2)_3OCH_2C_6H_5$, $(CH_2)_3OCH_2C_6H_4SO_3H$; $(CH_2)_3O(CH_2)_2OC_6H_5$; $(CH_2)_3O(CH_2)_2OC_6H_4SO_3H$; or $(CH_2)_3O(CH_2)_4OH$;

and D has the meanings given for claim 3.

7. The dye according to claim 1 having the formula

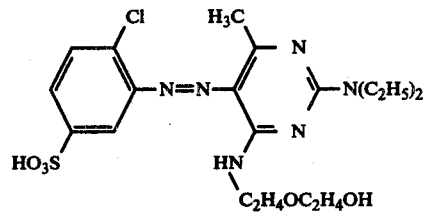

8. The dye according to claim 1 having the formula

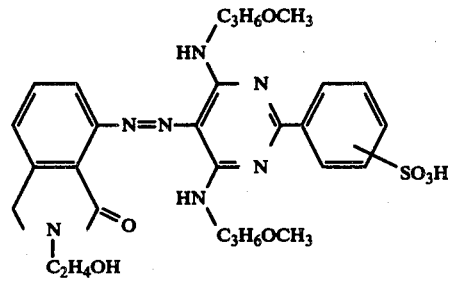

9. The dye according to claim 1 having the formula

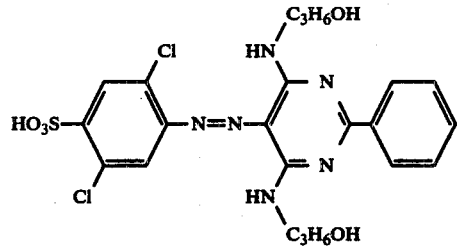

10. The dye according to claim 1 having the formula

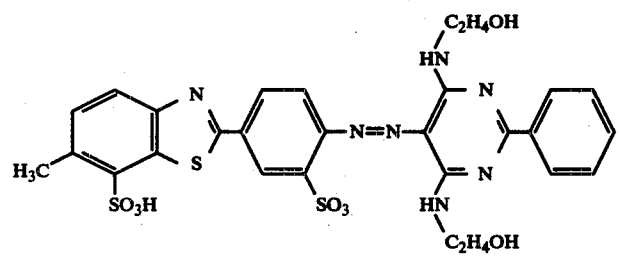

11. The dye according to claim 1 having the formula

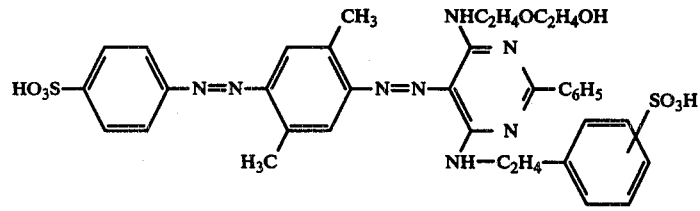

12. The dye according to claim 1 having the formula

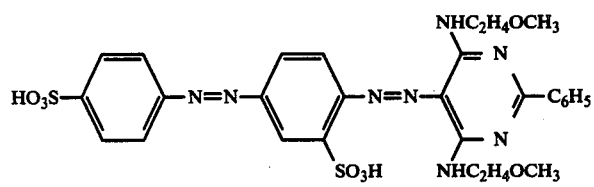

UNITED STATES PATENT AND TRADEMARK OFFICE
CERTIFICATE OF CORRECTION

PATENT NO. : 4,145,341
DATED : March 20, 1979
INVENTOR(S) : Johannes Dehnert et al It is certified that error appears in the above-identified patent and that said Letters Patent are hereby corrected as shown below:

Claim 8, in the Formula

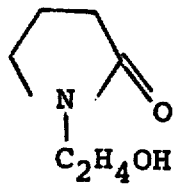   should read   --   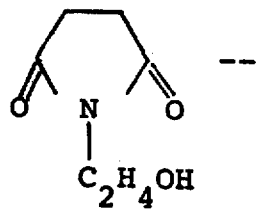 --

Claim 10, in the Formula

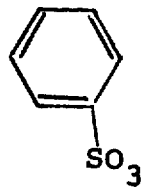   should read   --   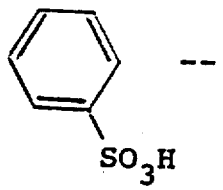 -- .

Signed and Sealed this

Twentieth Day of November 1979

[SEAL]

Attest:

RUTH C. MASON
Attesting Officer

LUTRELLE F. PARKER
Acting Commissioner of Patents and Trademarks